(12) United States Patent
Stol et al.

(10) Patent No.: US 10,286,483 B2
(45) Date of Patent: May 14, 2019

(54) METHOD AND SYSTEM FOR FORMING LASER BEAM WELD LAP-PENETRATION JOINTS

(71) Applicant: Hyperloop Technologies, Inc., Los Angeles, CA (US)

(72) Inventors: Israel Stol, Los Angeles, CA (US); Kristen Hammer, Redondo Beach, CA (US); Daniel Shafrir, Los Angeles, CA (US); Michael Gaunt, Los Angeles, CA (US); Thomas Ronacher, Del Aire, CA (US); Kyle Cothern, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/374,230

(22) Filed: Dec. 9, 2016

(65) Prior Publication Data

US 2017/0165786 A1    Jun. 15, 2017

Related U.S. Application Data

(60) Provisional application No. 62/266,392, filed on Dec. 11, 2015.

(51) Int. Cl.
| | | |
|---|---|---|
| *B23K 26/00* | (2014.01) | |
| *G05D 1/00* | (2006.01) | |
| *B23K 26/10* | (2006.01) | |
| *B23K 37/02* | (2006.01) | |
| *B23K 26/08* | (2014.01) | |
| *B23K 26/244* | (2014.01) | |
| *B23K 103/04* | (2006.01) | |
| *B23K 103/10* | (2006.01) | |

(52) U.S. Cl.
CPC ...... *B23K 26/0096* (2013.01); *B23K 26/0876* (2013.01); *B23K 26/106* (2013.01); *B23K 26/244* (2015.10); *B23K 37/0276* (2013.01); *G05D 1/0088* (2013.01); *B23K 2103/04* (2018.08); *B23K 2103/10* (2018.08)

(58) Field of Classification Search
CPC . B23K 26/0096; B23K 26/106; G05D 1/0088
USPC .................. 219/121.63, 121.64, 121.82
See application file for complete search history.

(56) References Cited

U.S. PATENT DOCUMENTS

| | | | | |
|---|---|---|---|---|
| 3,588,255 A | * | 6/1971 | Alexander .......... | G01C 15/002 172/4.5 |
| 4,029,932 A | * | 6/1977 | Cook ................. | B23K 26/0823 138/144 |
| 4,080,525 A | * | 3/1978 | Gobetz ................. | B23K 26/02 219/121.63 |

(Continued)

OTHER PUBLICATIONS

Search Report and Written Opinion in counterpart application No. PCT/US2016/065867, dated Apr. 6, 2017.

*Primary Examiner* — Samuel M Heinrich
(74) *Attorney, Agent, or Firm* — Greenblum & Bernstein, P.L.C.

(57) ABSTRACT

A method of forming an internally-arranged laser-beam weld from within a composite structure. The method includes arranging a welding apparatus within an internal passage of the composite structure, and emitting a laser beam from the welding apparatus to form the internally-arranged laser-beam weld between layers of the composite structure.

8 Claims, 24 Drawing Sheets

(56) References Cited

U.S. PATENT DOCUMENTS

| | | | |
|---|---|---|---|
| 4,295,031 A | | 10/1981 | Roen |
| 4,563,841 A | * | 1/1986 | Hart .................... B24C 3/325 |
| | | | 118/DIG. 10 |
| 5,007,225 A | | 4/1991 | Teasdale |
| 5,796,069 A | | 8/1998 | Jones et al. |
| 5,830,224 A | * | 11/1998 | Cohn .................... A61B 17/11 |
| | | | 606/167 |
| 6,044,769 A | | 4/2000 | Oka et al. |
| 2004/0118818 A1 | | 6/2004 | Oda et al. |
| 2012/0298628 A1 | | 11/2012 | Bowers |

\* cited by examiner

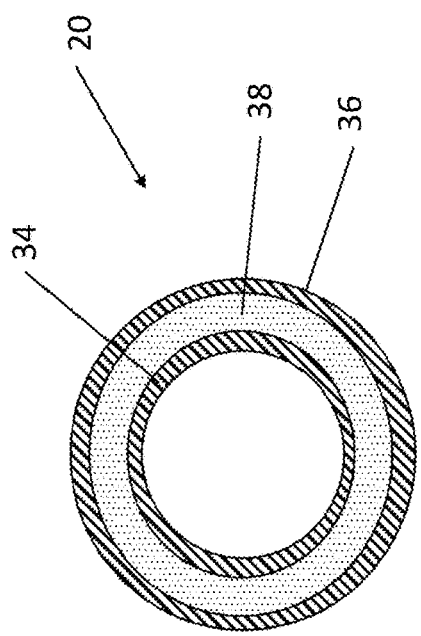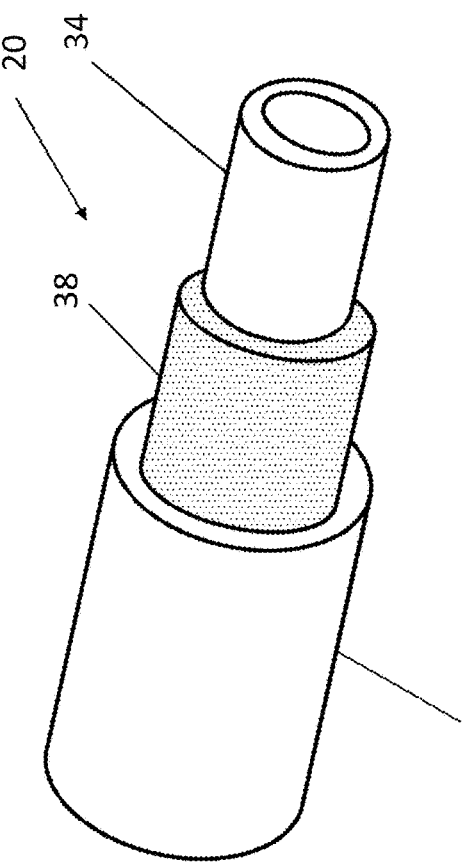

METHOD AND SYSTEM FOR FORMING LASER BEAM WELD LAP-PENETRATION JOINTS

CROSS-REFERENCE TO RELATED APPLICATION

The present application claims the benefit of U.S. Provisional Application No. 62/266,392, filed Dec. 11, 2015, the contents of which are expressly incorporated herein by reference in its entirety.

FIELD OF THE DISCLOSURE

The present disclosure relates to forming weld lap-penetration joints, and more particularly, to methods and systems for forming laser beam weld lap-penetration joints internally from within corrugations of a composite structure, and composite structures having such internally-formed welds.

BACKGROUND OF THE DISCLOSURE

Traditional transportation modes via water, land, rail, and air revolutionized the movement and growth of our current culture. The adverse environmental, societal and economic impacts of these traditional modes of transportation, however, initiated a movement to find alternative modes of transportation that take advantage of the significant improvements in transportation technology so as to efficiently move people and materials between locations. High-speed transportation systems utilizing rails or other structural guidance components have been contemplated as a solution to existing transportation challenges, while improving safety, decreasing the environmental impact of traditional modes of transportation and reducing the overall time commuting between, for example, major metropolitan communities.

Particular high speed, high efficiency transportation systems utilize a low pressure environment in order to reduce drag on a vehicle at high operating speeds, thus providing the dual benefit of allowing greater speed potential and lowering the energy costs associated with overcoming drag forces. These systems may use a near vacuum environment within a tubular structure. Possibly the single greatest cost associated with the project is the tubular structure, e.g., made from a metal alloy, which spans the entire length of the project. Thus, there is a need in the art for an improved methods and apparatuses, for more efficiently forming tubular structures.

SUMMARY OF THE EMBODIMENTS OF THE DISCLOSURE

At least some embodiments of the present disclosure are directed to forming weld lap-penetration joints, and more particularly, to methods and systems for forming laser beam weld lap-penetration joints internally from within corrugations of a composite structure, and composite structures having such internally-formed welds.

Aspects of the disclosure are directed to a method of forming an internally-arranged laser-beam weld from within a composite structure. The method comprises arranging a welding apparatus within an internal passage of the composite structure, and emitting a laser beam from the welding apparatus to form the internally-arranged laser-beam weld between layers of the composite structure.

In some embodiments, the composite structure comprises two outer layers and a corrugated layer formed between the two outer layers.

In embodiments, the internal passage is formed by the corrugated layer and one of the two outer layers.

In embodiments, the weld is formed between the corrugated layer and one of the two outer layers by welding from the exposed side of the corrugated layer.

In some embodiments, the weld is formed between different regions of the corrugated layer.

In additional embodiments, the method further comprises advancing the welding apparatus along the internal passage as the weld is formed.

In yet further embodiments, the welding apparatus includes an aligning system operable to maintain the welding apparatus in a proper orientation as the welding apparatus is advanced along the internal passage during weld formation. The method further comprises utilizing the aligning system to maintain the welding apparatus in the proper orientation.

In some embodiments, the aligning system includes a plurality of legs extending from a base of the welding apparatus, and respective rollers arranged at ends of the legs, wherein the rollers are engagable with corners of the passageways to maintain the laser beam welder in the proper orientation.

In additional embodiments, a plurality of internally-arranged laser-beam welds are substantially simultaneously formed within a plurality of internal passages from within the composite structure using a plurality of the welding apparatuses, wherein each welding apparatus is arranged to traverse one of the plurality of internal passages to form a weld within a respective internal passage of the plurality of internal passages.

Further aspects of the disclosure are directed to a laser beam welding apparatus, comprising a base, a laser focusing head attached to the base and operable to emit a laser beam, and one or more aligning structures attached to the base.

In some embodiments, the aligning structures includes a plurality of legs extending from the base of the welding apparatus, and respective rollers arranged at ends of the legs, wherein the rollers are structured and arranged to be engagable with corners of internal passages of a composite structure.

In additional embodiments, the one or more aligning structures comprises a plurality of aligning structures arranged along the longitudinal axis of the base of the welding apparatus.

In certain embodiments, the laser focusing head rotatably attached to the base, such that the laser focusing head is rotatably adjustable.

In some embodiments, the apparatus further comprises a laser-beam transmitting fiber-optic cable and laser beam focusing arrangement, wherein the laser-beam transmitting fiber-optic cable is operable to receive a laser beam from a laser beam generator, and transmit the laser beam to the laser beam focusing arrangement.

In some embodiments, the laser beam focusing arrangement includes one or more lenses and a mirror.

In yet further embodiments, the laser beam welding apparatus is configured as a semi-autonomous vehicle operable to traverse the passage.

Additional aspects of the disclosure are directed to a composite structure comprising an outer plate, an inner plate and a corrugated layer arranged between the outer plate and the inner plate. The outer plate, inner plate and corrugated layer forma plurality of passages in the composite structure extending along a z-axis. A plurality of internally-formed laser beam welds extending along the z-axis that connect the corrugated layer to the outer plate or the inner plate.

In some embodiments, the plurality of passages comprise congruent passages.

In embodiments, the inner and outer plate have a thickness, and the corrugated layer has a relatively smaller thickness.

In yet further embodiments, the corrugated layer comprises an undulating layer forming outer faces structured and arranged to contact the outer plate, inner faces structured and arranged to contact the inner plate, and side faces extending between the inner faces and the outer faces.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the disclosure in conjunction with the following exemplary and non-limiting drawings wherein:

FIGS. 3A and 3B show an exemplary and non-limiting composite tube structure in accordance with aspects of the disclosure;

DETAILED DISCLOSURE OF EMBODIMENTS OF THE DISCLOSURE

Figure 1:
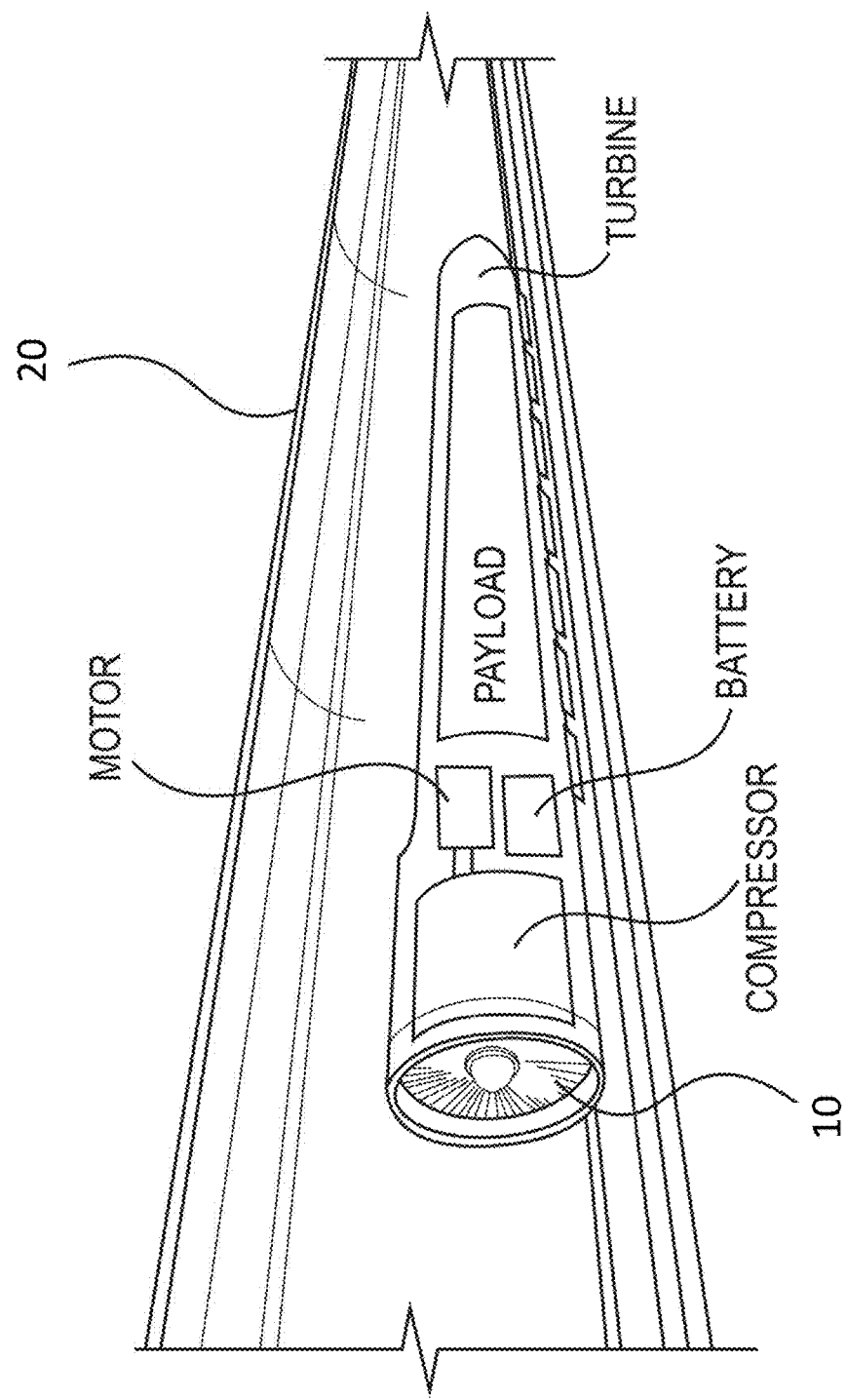
FIG. 1 shows an exemplary and non-limiting depiction of a transportation system in accordance with aspects of the disclosure.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also indicate that mixtures of one or more magnetic materials can be present unless specifically excluded. Put another way, for example, as used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" indicates "only A, or only B, or both A and B." In the case of "only A," the term also covers the possibility that B is absent, i.e. "only A, but not B."

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

The various embodiments disclosed herein can be used separately and in various combinations unless specifically stated to the contrary.

Embodiments of the present disclosure may be used in a transportation system, for example, as described in commonly-assigned application Ser. No. 15/007,783, titled "Transportation System," the contents of which are hereby expressly incorporated by reference herein in their entirety.

A high speed, high efficiency transportation system utilizes a low pressure environment in order to reduce drag on a vehicle at high operating speeds, thus providing the dual benefit of allowing greater speed potential and lowering the energy costs associated with overcoming drag forces. These systems may use a near vacuum within a tubular structure. These systems utilize any number of acceleration systems to achieve the high speed allowed, including electromagnetic levitation.

Referring now to FIG. 1, an exemplary and non-limiting transportation system is illustrated. The transportation system includes a capsule or transport pod 10 that is movable within a tube 20 maintained as a near-vacuum environment.

Figure 2:
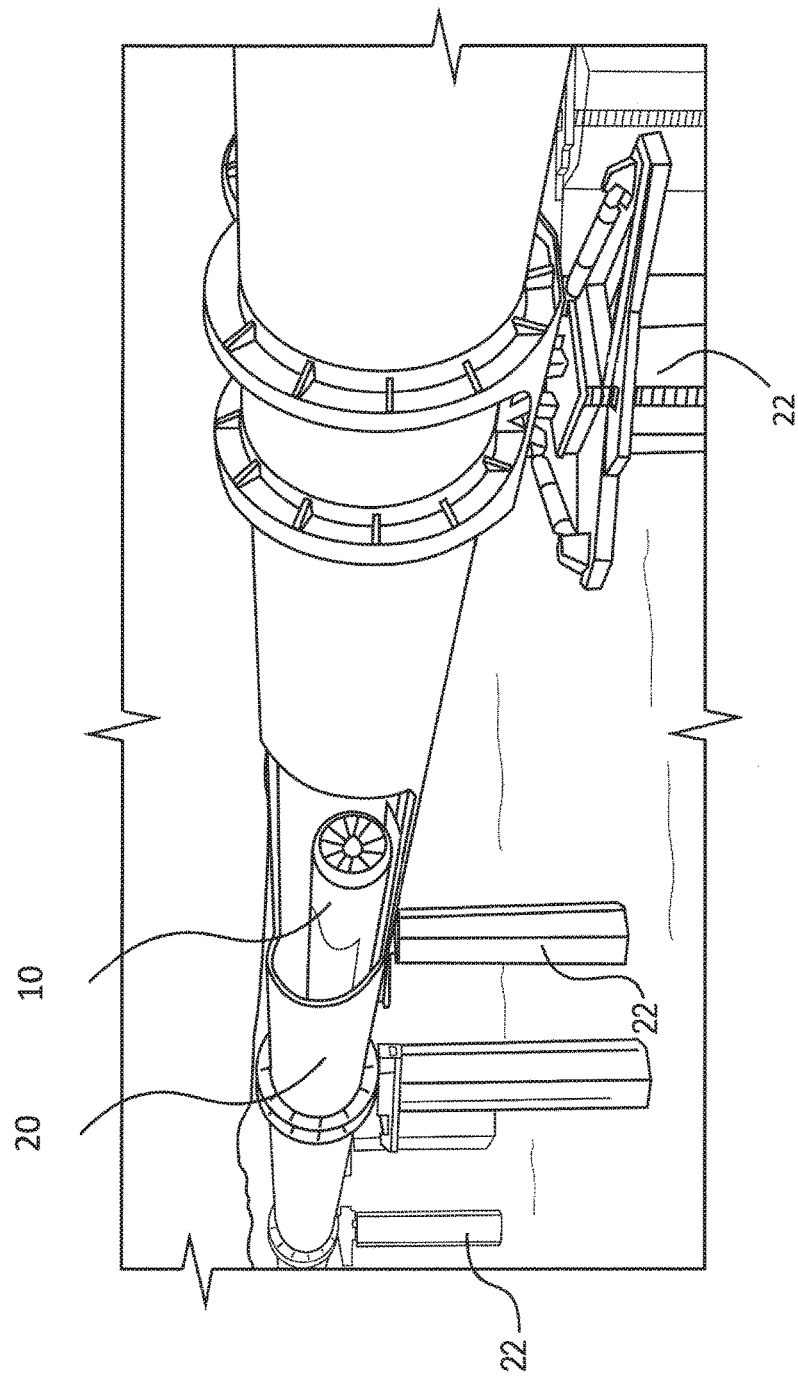
FIG. 2 shows an exemplary and non-limiting depiction of the transportation system in accordance with aspects of the disclosure.

Referring now to FIG. 2, one or more tubes 20 of transportation system is illustrated in greater detail. As shown in FIG. 2, in one exemplary and non-limiting embodiment of the present disclosure, a capsule 10 is traveling through the tube 20, which is supported above ground by a series of supports (e.g., pillars 22) spaced apart along a path of travel.

While many high-speed transportation systems have been proposed or adopted, this vacuum-enabled system anticipates being the most efficient way to connect sister-cities or clusters of destinations that are within, for example, 900 miles of each other. Possibly the single greatest cost associated with the project, however, may be the tubular structure, e.g., made from a metal alloy, which spans the entire length of the project.

Pipelines, for purposes such as oil transportation, are formed having a single solid wall. Most pipelines, for purposes such as oil transportation, have a maximum diameter of 4 feet and are buried underground. Due to, for example, cost and/or weight considerations, however, using a transportation tube structure formed from a single solid wall may not be optimal for the transportation system. For example, a transportation tube structure may require hundreds of miles of tube of sufficient strength and/or thickness to contain a near-vacuum, at a sufficient diameter to allow passage of a vehicle. If solid steel, for example, were used for such a structure, costs could be in the hundreds of millions to billions of dollars. Moreover, tubes formed of solid steel walls would increase the overall weight of the structure. Thus, a need exists for more efficient tubular structures for the transportation system.

To address these cost and weight impediments, in accordance with aspects of the disclosure, embodiments of the tubular structure of the present disclosure may utilize a laminate pipe structure including two relatively thicker solid outer walls with an interior wall portion arranged between the outer walls that is formed of a different material and/or having a different (e.g., thinner) material thickness. For example, some embodiments of the tubular structure may utilize a pipe structure including solid outer walls with an interior portion formed by a corrugated structure forming hollow passages between the two outer walls.

Referring now to FIGS. 3A and 3B, an exemplary construction of the tube 20 is illustrated. As shown in FIGS. 3A and 3B, the disclosure contemplates that tube 20 may include a first or inner layer 34 and one or more outer layers 36. Inner layer 34 and outer layers 36 may be manufactured from a variety of composites, plastics and/or metals to cooperate with the design requirements of the transportation system to maximize the efficiency of travel of the capsule within the inner layer and the structural and environmental requirements of the outer layer. For example, in embodiments, the outer layer 36 may be optimized for the ambient environmental conditions (e.g., to reduce wear from weather and/or corrosion). Additionally, for example, in embodiments, the outer layer 36 may be optimized to be resistant to puncture from, for example, gun shots. Furthermore, the inner layer 34 may be optimized for conditions in the low-pressure environment within the tube interior. Inner layer 34 and outer layer 36 may be secured in position adjacent each other through a variety of mechanical and/or chemical joining process, including, but not limited to, adhesive bonding, metal bonding, brazing, and the like.

As shown in FIGS. 3A and 3B, tube 20 further includes one or more intermediate layers 38 disposed between the inner layer 34 and outer layer 36. In one embodiment of the present invention, intermediate layer 38 may be formed of a corrugated metal structure that maintains many of the physical properties of the base metal materials, while increasing strength, reducing thermal conductivity and/or significantly reducing the weight of the intermediate layer 38 and the tube 20. It is also contemplated that other fiber, polymeric and composite materials may be used to create, enhance and/or supplement the intermediate layer 38. In accordance with aspects of the disclosure, by utilizing an intermediate layer 38, the wall thickness of the inner layer 34 and/or the outer layer 36 may be reduced.

By forming the tube with an intermediate layer 38, the costs of tube manufacturing may be reduced, as the overall thickness of tube 20 may be reduced. Moreover, by utilizing an intermediate layer 38 of lower weight (as compared to the other materials of the tube wall), the entire weight of the tube section may be reduced, while providing a tube having the same (or similar) strength and/or stiffness properties.

While the depicted exemplary embodiment illustrates three layers, in embodiments the tube construction may include more than three layers. For example, a tube may include more than one "inner" layer and/or more than one "outer" layer. Additionally, the tube may include an additional middle metal corrugated layer and an additional internal layer between the middle metal layer and either the inner wall or the outer wall, thus providing a metal-fill-metal-fill-metal laminate construction.

One non-limiting embodiment is related to a structure for the intermediate layer 38, which may be defined as a continuously-formed corrugated layer. In embodiments, the corrugated layer may comprise a lightweight core in between two substantially thin, stiff face sheets or may comprise a single layer forming the corrugated layer. The core comprises a structure in which a repeating lattice extends through an area with a constant thickness. The sandwich panel and core can be formed from a number of sufficiently stiff materials, including metals, foam, plastic, rubber, and/or metal alloys.

With such a laminate structure, the tubular structure elements, comprising the two outer layers and the internal corrugated layer, may be joined to one another, e.g., by welding. That is, for example, each of the two thicker solid outer walls may be joined to the interior wall portion. Using lap joints, many pieces can be welded together in a lap joint geometry (depending on the process used and/or the thicknesses of the materials).

Laser beam welding (LBW) is a welding technique used to join multiple pieces of metal through the use of a laser. Laser beam welding employs a highly focused laser beam. The beam provides a concentrated heat source, allowing for narrow, deep welds and high welding rates. The process is extremely fast, and is easily automated, making the process highly productive. As such LBW is frequently used in high volume applications using automation, such as in the automotive industry. It is based on keyhole or penetration mode welding.

Laser beam welding has high power density (on the order of 1 MW/cm$^2$) resulting in small heat-affected zones and high heating and cooling rates. The spot size of the laser can vary between, for example, 0.2 mm and 13 mm, though only smaller sizes may be used for welding. The depth of penetration is proportional to the amount of power supplied, but is also dependent on the location of the focal point. For example, penetration may be maximized when the focal point is slightly below the surface of the workpiece.

With LBW, a continuous or pulsed laser beam may be used depending upon the application. For example, millisecond-long pulses may be used to weld relatively thin materials, while continuous laser systems may be employed for deeper welds. LBW is a versatile process, capable of welding a myriad of different materials, including carbon steels, HSLA steels, stainless steel, aluminum, and titanium, any of which may be used in embodiments of the present disclosure. The weld quality is high, similar to that of electron beam welding. The speed of welding is proportional to the amount of power supplied but also depends on the type and thickness of the workpieces. The high power capability of gas lasers make them especially suitable for high volume applications.

Modern laser beam welding machines can be grouped into two types. In the traditional type, the laser output is moved to follow the seam. This is usually achieved with a robot. In many modern applications, remote laser beam welding is used. In this method, the laser beam is moved along the seam with the help of a laser scanner, so that the robotic arm does not need to follow the seam any more. The advantages of remote laser welding are the higher speed and the higher precision of the welding process.

The effects of welding on the material surrounding the weld can be detrimental—depending on the materials used and the heat input of the welding process used, the heat-affected zone (or HAZ) can be of varying size and strength. The thermal diffusivity of the base material plays a large role—if the diffusivity is high, the material cooling rate is high and the HAZ is relatively small. Conversely, a low diffusivity leads to slower cooling and a larger HAZ. The amount of heat injected by the welding process plays an important role as well. Processes like laser beam welding give a highly concentrated, limited amount of heat, resulting in a small HAZ.

As noted above, however, the depth of penetration is proportional to the amount of power supplied, and also dependent on the location of the focal point. In the context of a transportation tube, if, for example, laser beam welds are performed from the external surfaces of the two thicker solid exterior walls and through the two thicker solid exterior walls (in order to form welds with an interior wall portion having a thinner material thickness), due to the increased thickness of the outer walls (relative to the thinner interior wall portion), there is a possibility of damaging or even destroying the interior wall portion when attempting to penetrate through the relatively thicker exterior walls. That is, the energy necessary for the laser beam to traverse the relatively thicker outer walls may be too much energy for performing the actual weld of the thicker outer material to the relatively thinner inner material, thus resulting in damage to (or destruction of) the thinner interior wall portion.

Thus, there is a need in the art for an improved welding method and apparatus, particularly a welding method and apparatus for such a laminate structure that solves the drawbacks of current approaches.

In accordance with aspects of the disclosure, in embodiments, welds (e.g., laser beam welds or LBW) are formed internally within the composite structure (e.g., between the relatively thicker outer and inner external walls and the relatively thinner internal walls) by arranging a laser beam welder within internal passages the tubular structure adjacent the relatively thinner internal walls of the corrugated layer. As such, when the welds are formed excessive energy is not required to form the weld. That is, due to the internally arrangeable laser welder, the laser beam does not traverse the relatively thicker outer walls, and thus a laser beam weld can be formed while damage to (or destruction of) the relatively thinner internal walls of the corrugated layer can be prevented. Moreover, in accordance with aspects of the disclosure, the welding of pre-formed thin corrugations with an outward convexity helps to ensure intimate contact between the parts at the seams where welds are being formed. That is, once the relatively thinner corrugation layer is arranged and sandwiched between the relatively thicker outer walls, the corrugations are compressively loaded and their outwardly convex portions will be elastically deformed, ensuring a consistent intimate contact between the parts being welded through the lap-penetration joints. In embodiments, the materials for the outer layers and the internal corrugated layer may include any fusion-weldable materials, including, for example, 1018 mild steel, A36 steel, 316L stainless steel, 061, 5083 aluminum alloys, etc.

Figure 4:
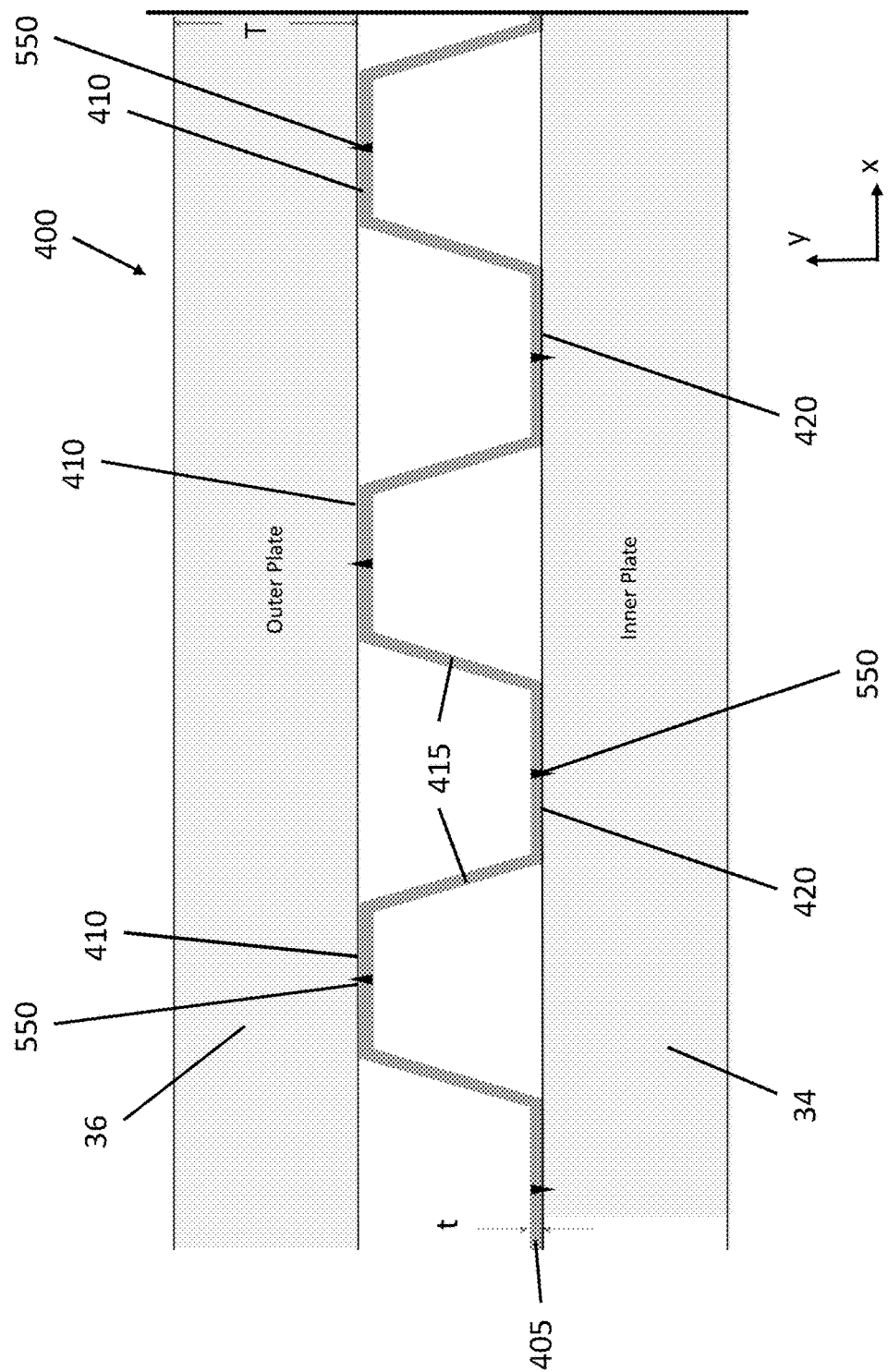
FIG. 4 shows an exemplary and non-limiting composite structure in accordance with aspects of the disclosure.

FIG. 4 shows a schematic depiction of an exemplary and non-limiting composite structure 400 in accordance with aspects of the disclosure. As shown in FIG. 4, the composite structure 400 includes an inner plate 34 and an outer plate 36. A corrugated layer 405 is arranged between the inner plate 34 and the outer plate 36. The corrugated layer 405 is structured and arranged with outer faces 410, which contact the outer plate 36, inner faces 420, which contact the inner plate 34, and side faces 415, which extend between the outer faces 410 and the inner faces 420.

With an exemplary and non-limiting embodiment, the corrugated layer 405 may have a thickness t of approximately 0.4 mm (0.016"), with other thicknesses contemplated by the disclosure. The undulating shape of the corrugated layer 405, including the relative angles of the side faces 415 and the lengths of the outer faces 410 and inner faces 420 is not necessarily limited and may be selected based in part on the materials of the corrugated layer 405 and/or the materials of the inner plate 34 and outer plate 36. With an exemplary and non-limiting embodiment, the inner plate 34 and the outer plate 36 may each have a thickness T of approximately 6.4 mm (0.25"), with other thicknesses contemplated by the disclosure.

As schematically depicted in FIG. 4, in accordance with aspects of the disclosure, the composite structure 400 includes a series of welds 550 (e.g., lap joint welds) formed between the outer faces 410 and the outer plate 36 and between the inner faces 420 and the inner plate 34. As should be understood, the welds 550 extend linearly along a z-axis of the composite structure 400 (i.e., into the page as depicted in FIG. 4).

While the exemplary embodiment of FIG. 4 is depicted as planar, it should be understood that the embodiment of FIG. 4 could be formed as a rounded (or tubular) structure either prior to some or all of the welding, or after all of the welds have been formed.

Figure 5:
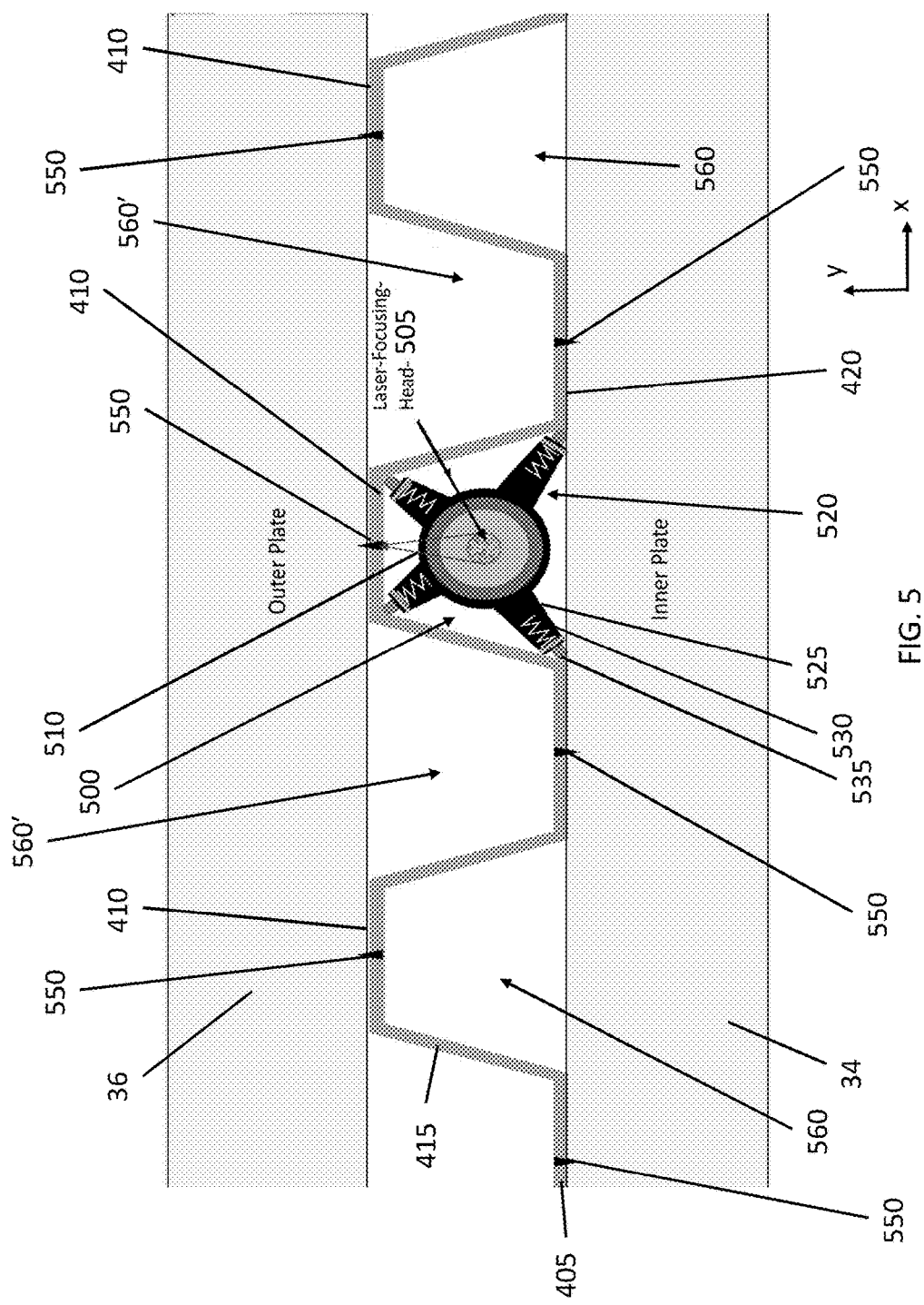
FIG. 5 shows an exemplary and non-limiting composite structure and an exemplary and non-limiting welding apparatus in accordance with aspects of the disclosure.

FIG. 5 shows an exemplary and non-limiting composite structure 400 and an exemplary and non-limiting welding apparatus 500 arranged in the composite structure 400 in accordance with aspects of the disclosure. As shown in FIG. 5, the welding apparatus 500 is structured and arranged to traverse (along a z-axis) passages 560 formed by the corrugated layer 405 and the inner plate 34, and (with a flipped orientation) passages 560' formed by the corrugated layer 405 and outer plate 36, to arrange a laser-focusing head 505 in proximity to the layers to be welded to form welds 550. In embodiments, the weld 550 may be a continuous weld, or a series of multiple discreet welds (along the z-axis).

By implementing aspects of the disclosure, by welding the relatively thin corrugation layers to themselves and/or the relatively thicker outer and inner tubes (or plates), from within the composite structure, damage to the structure is avoided. By utilizing the disclosed welding apparatus, which is operable to traverse the internal passages of the composite structure, a serious problem of accessibility necessary for suitably welding portions of these parts with the LBW process is overcome. Additionally, by implementing aspects of the disclosure, a higher % utilization of the LBW process may be achieved, which may reduce (or altogether replace) a need for any other supplemental joining process within the composite structure (such as adhesive bonding or brazing of the composite structures). As noted below, however, embodiments of the present disclosure contemplate utilizing supplemental joining processes. Furthermore, implementing aspects of the disclosure provides extra flexibility (e.g., more options) to engineers in designing and manufacturing composite tubes for improved performance in service, manufacturability, productivity and/or cost effectiveness.

While aspects of the disclosure are directed to providing welds between layers of the composite structures, in embodiments of the disclosure, the forming process may also utilize adhesives (e.g., sealing adhesives) and/or epoxy inside and/or around the welded corrugations. In embodiments, this may be achieved, for example, by post-weld dipping or spraying these adhesive materials into the corrugations so that the adhesive materials seep into crevices formed between the welded and un-welded portions of the corrugated layer. In accordance with aspects of the disclosure, upon curing, the adhesives may provide additional shear-strength resistance, in all directions, to the strength already provided by the laser welds. This may allow a reduction of the weld magnitude (e.g. size of weld and/or depth of weld) between the different parts of the corrugations (e.g., to weld one end of the corrugated layer to another end of the corrugated layer) and between corrugation layer and the relatively thicker inner and outer tubes. Additionally, the adhesives may form a coating to fill crevices thereby protecting the crevices from crevice-corrosion damage. For example, if corrosive agents (e.g., seawater) seep into the tubes, the adhesive coating may prevent initiation (e.g., pitting) and/or progression of corrosion, thus preventing faying of surfaces of the composite structure. Furthermore, the adhesives may dampen fretting (e.g., rubbing) between the welded and un-welded portions of the composite structure over time and dampen any noise that may be generated by this fretting. In further contemplated embodiments, epoxy (e.g., an epoxy containing concrete) may be injected or applied via dipping to the inner cavities of the composite structure to provide similar benefits to those achieved with the adhesives.

With reference again to FIG. 5, with an exemplary embodiment, the welding apparatus 500 includes a laser beam welder (LBW), which is operable to produce a laser beam 510 (or transmit a remotely produced). The laser beam 510 (suitable for forming laser beam welds 550) is emitted from the laser focusing head 505. The welding apparatus 500 includes a plurality of aligning/tracking and rolling systems 520 having respective legs 525 arranged around the exterior of the welding apparatus 500. The legs 525 of the rolling systems 520 are structured and arranged to engage with the corners formed by the corrugated layer 405 and the outer plate 36 or the inner plate 34 as the welding apparatus 500 traverses the passages 560, 560' in the z-direction, so that the laser beam weld is formed in the proper position. Embodiments of the present disclosure may also utilize other (or additional) approaches for ensuring proper alignment and formation of the laser beam weld, including, for example, laser guided control of the welding apparatus.

By engaging the corners, the legs 525 of the aligning/tracking and rolling systems 520 ensure the welding apparatus 500 is properly aligned in the passages 560, 560', so that the welds 550 are formed in the intended location. While only one aligning/tracking and rolling system 520 (having four legs 525) are depicted in FIG. 5, in embodiments, the welding apparatus 500 may utilize a plurality of aligning/tracking and rolling systems 520 in line with each other along the longitudinal axis of the welding apparatus 500.

With the exemplary embodiments, each leg 525 of the aligning/tracking and rolling system 520 further includes a roller 535 structured and arranged to engage a corner of a respective passage 560, 560' and a spring 530 structured and arranged to push a respective roller 535 outwardly so as to maintain engagement with a respective corner of the passage 560, 560'. As shown in the exemplary embodiment of FIG. 5, the legs 525 are configured for the utilized shape of the passages 560, 560'. As such, with the exemplary composite structure 400, some of the legs 525 (e.g., the legs on the upper side of the welding apparatus 500) may be differently configured (e.g., shorter, smaller, and/or arranged at a different relative angle) compared to the legs 525 on the lower side of the welding apparatus 500. It should be understood that elements of the welding apparatus 500, for example the legs of the welding apparatus, may take different forms based on the size and shape of the passages formed by the structural design of the corrugated layer and the inner and outer plates.

As shown in FIG. 5, with some contemplated embodiments, the passages 560 and passages 560' have corresponding similar shapes (albeit rotated 180°). As such, in accordance with aspects of the disclosure, the same welding apparatus 500 may be used to form the welds in passages 560 and 560' by rotating the welding apparatus 500 by approximately 180° prior to inserting the welding apparatus 500 into a respective passage (e.g., manually or by automation). Other contemplated embodiments, however, may utilize a corrugated layer that forms passages having different sizes. It should be understood that the structural design of the corrugated layer and the inner and outer plates may take many forms depending, for example, on the materials used and/or design requirements. In such cases, different welding apparatuses may be configured for the differently-sized passages, as should be understood.

In accordance with aspects of the disclosure, by forming the welds 550 from the internal passages 560, 560' inside of the composite structure 400, the magnitude of the laser intensity can be optimized for forming the welds 550 without causing damage to the welded, layers (e.g., the thinner welded layer, i.e., the corrugated layer 405). By utilizing a welding apparatus 500 that is operable to traverse the internal passages of the composite structure, LBW can be utilized in a structure that otherwise (due to the external wall relative thickness) could not use laser beam welds.

Figure 6A:
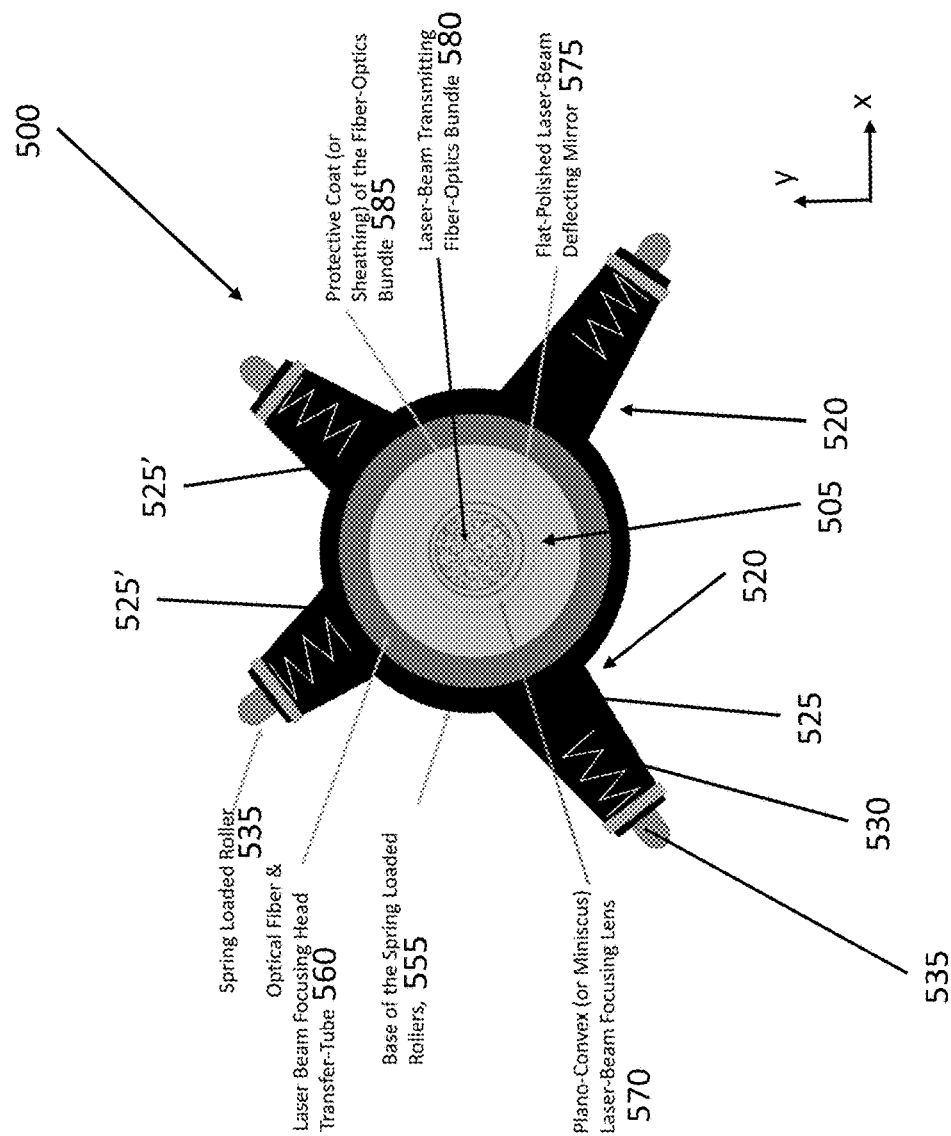
FIGS. 6A and 6B schematically depict views of an exemplary and non-limiting welding apparatus in accordance with aspects of the disclosure.
Figure 6B:
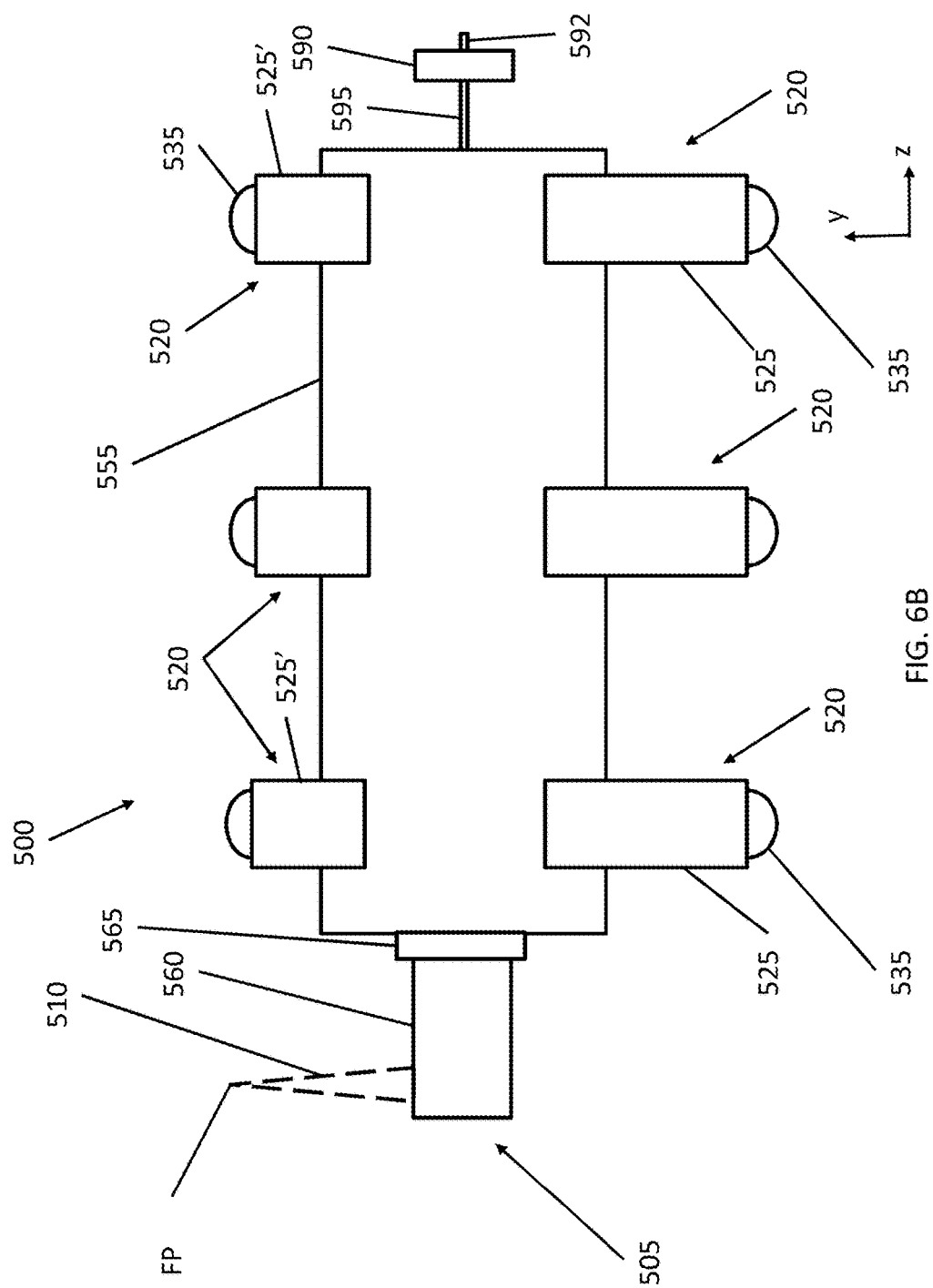

FIGS. 6A and 6B schematically depict additional views of an exemplary and non-limiting welding apparatus 500 in accordance with aspects of the disclosure. FIG. 6A shows an axial view of the welding apparatus 500. As shown in FIG. 6A, the welding apparatus 500 includes a base 555 on which the legs 525, 525' of the aligning/tracking and rolling systems 520 are arranged. As noted above, the legs 525' on the upper side of the welding apparatus 500 may have a different configuration from the legs 525 on the lower side of the welding apparatus 500 (e.g., may be shorter, smaller, and/or arranged at a different relative angle). Each of the legs 525, 525' include a roller 535 structured and arranged to engage a corner of a respective passage (not shown) and a spring 530 structured and arranged to push a respective roller 535 outwardly so as to maintain engagement with a respective corner of the respective passage (not shown) as the welding apparatus 500 traverses the passage in the Z-direction. In embodiments, the rollers 535 may comprise metal, rubber, and/or some other polymer material. While embodiments depict spring-loaded rollers, other contemplated embodiments may utilize other stabilizing/orienting systems including pneumatic stabilizers.

As further shown in FIG. 6A, the welding apparatus 500 includes a laser-focusing head 505 attached to the base 555. The laser-focusing head 505 includes an optical fiber and focusing head transfer tube 560, which may be stainless steel, for example. A laser-beam transmitting fiber-optics bundle 580 and protective sheath 585 for the fiber-optics bundle 580 are arranged within the optical fiber and focusing head transfer tube 560. Additionally, a laser beam focusing lens 570 (e.g., a plano-convex or meniscus lens) and a laser beam deflecting mirror 575 are arranged in the focusing head transfer tube 560.

FIG. 6B schematically depicts a side view of the welding apparatus 500. As shown in FIG. 6B, the welding apparatus 500 includes a base 555 on which the legs 525, 525' of the aligning/tracking and rolling systems 520 are arranged. As noted above, the legs 525' on the upper side of the welding apparatus 500 may have a different configuration from the legs 525 on the lower side of the welding apparatus 500 (e.g., may be shorter, smaller, and/or arranged at a different relative angle). Each of the legs 525, 525' includes a roller 535 structured and arranged to engage a corner of a respective passage (not shown) and a spring (not shown) arranged therein and structured and arranged to push a respective roller 535 outwardly so as to maintain engagement with a respective corner of the respective passage (not shown) as the welding apparatus 500 traverses the passage in the Z-direction. In embodiments, the rollers 535 may include respective motors and/or gears to propel the welding apparatus 500 through the passages. For example, the welding apparatus 500 may be an autonomous or semi-autonomous vehicle operable to traverse the passages. The welding apparatus vehicle may utilize GPS to provide positional data to and/or from the welding apparatus vehicle.

Depending on how the corrugated layer is arranged in composite structure, the passages formed thereby (which may be relatively small) may also extend the entire longitudinal distance of a tube formed by the composite structure. As such, in accordance with aspects of the disclosure, an autonomous or semi-autonomous welding apparatus vehicle (e.g., having an attached tether to a control system) is operable to travel significant distances in an autonomous or semi-autonomous manner while forming the welds. In other embodiments, the rollers 535 may be passive, and the welding apparatus may be moved through the passages by, for example, an actuating shaft.

As further shown in FIG. 6B, the welding apparatus 500 includes a laser-focusing head 505 attached to the base 555. The laser-focusing head 505 includes an optical fiber and focusing head transfer tube 560. The laser-focusing head 505 is operable to emit a laser beam 510 having an adjustable focal point FP (e.g. for forming laser beam welds in different structures and/or with different materials). As also shown in FIG. 6B, in embodiments, the welding apparatus may include or be attached to an extensible shaft 595 structured and arranged for moving the welding apparatus 500 through the passages. In such embodiments, the welding apparatus 500 may also include a rotator 590 that is operable to rotate the base 555 (and the attached laser-focusing head 505) by approximately 180° so as to orient the welding apparatus 500 for insertion into an oppositely-oriented passage.

As shown in FIG. 6B, the welding apparatus 500 may also include a wired connection 592 including a fiber optic connection to a remote laser beam source, and a connection to a control system (e.g., specifically configured computer having a processor). In further embodiments, the welding apparatus 500 may be directly connected to a wired connection 592 (i.e., without an extensible shaft 595 and rotator 590). As schematically depicted in FIG. 6B, in some embodiments, the welding apparatus 500 may also include a laser-focusing head rotator 565 structured and arranged for rotating the laser-focusing head 505 relative to the base 555 so as to weld different types of joints within the passages of the corrugated layer (e.g., welding lap joints between external walls and the corrugated layer or joints between ends of the corrugated layer).

Figure 7A:
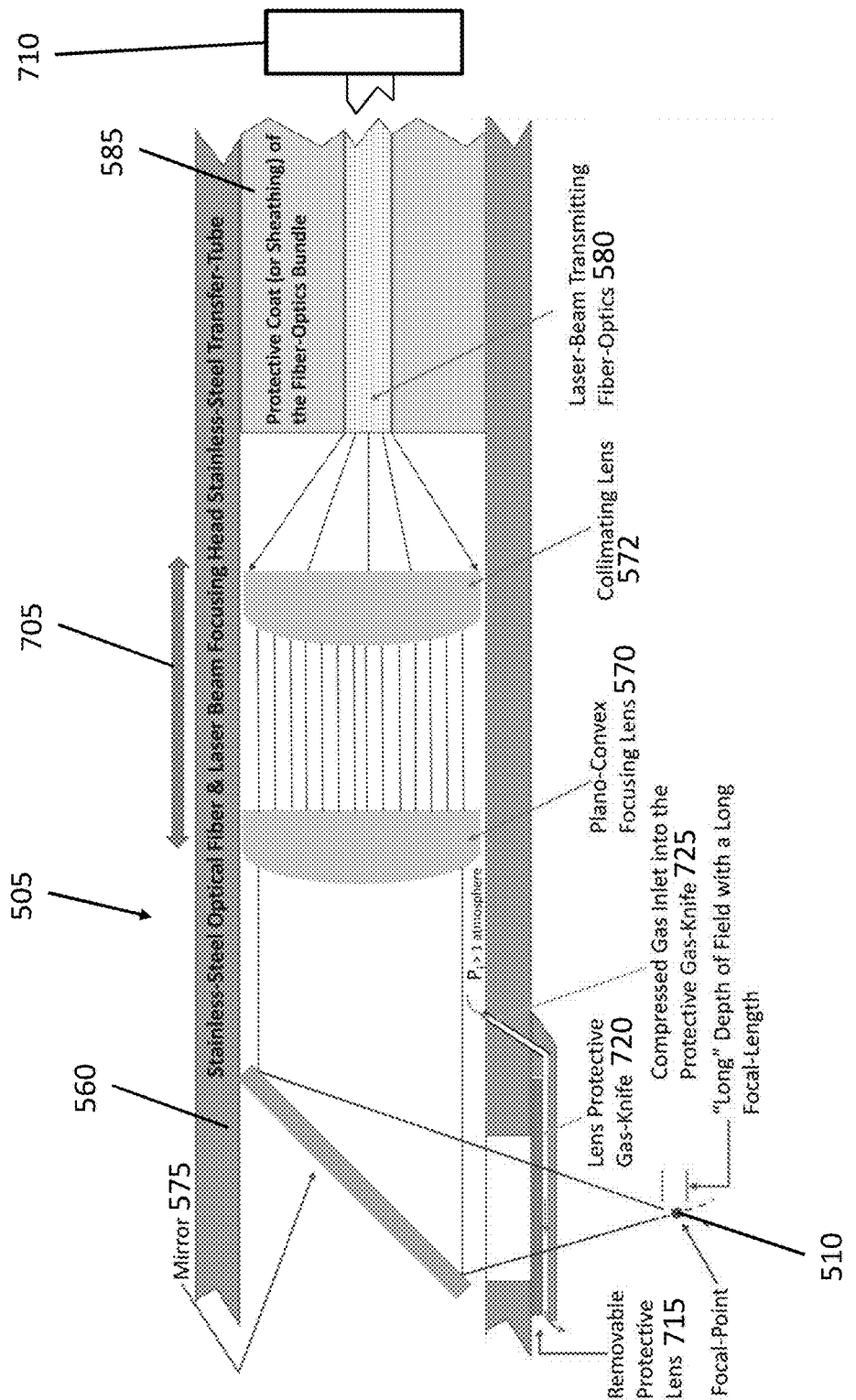
FIGS. 7A and 7B schematically depict exemplary and non-limiting laser beam focusing heads for a welding apparatus in accordance with aspects of the disclosure.
Figure 7B:
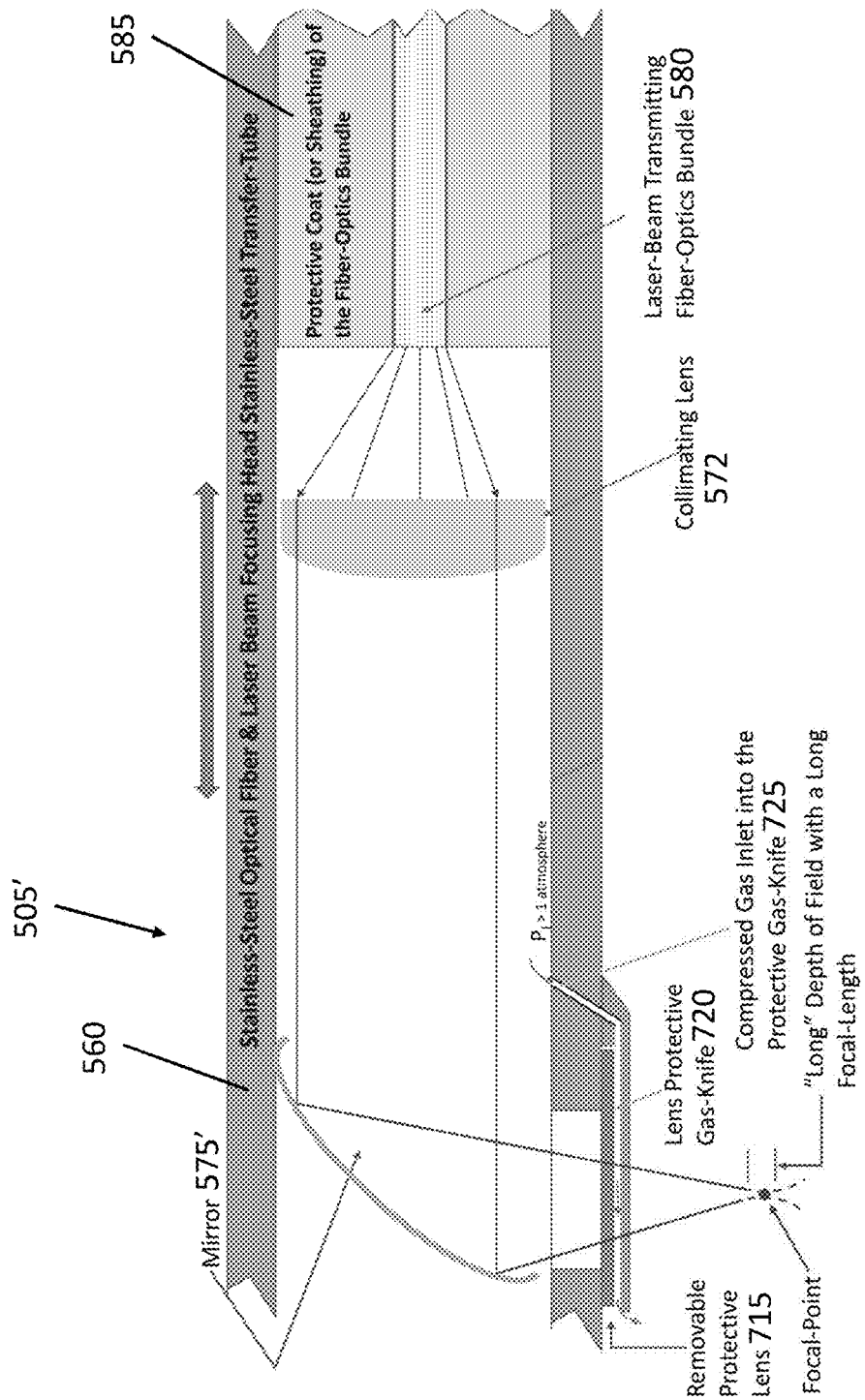

FIGS. 7A and 7B schematically depict exemplary and non-limiting laser beam focusing heads for a welding apparatus in accordance with aspects of the disclosure. As shown in the exemplary embodiment of FIG. 7A, the laser beam focusing head 505 includes an optical fiber and focusing head transfer tube 560. A laser-beam transmitting fiber-optics bundle 580 and protective sheath 585 for the fiber-optics bundle 580 are arranged within the optical fiber and focusing head transfer tube 560. In an exemplary and non-limiting embodiment, the laser-beam transmitting fiber-optics bundle 580 may have a diameter of approximately 300 microns. A laser beam generator 710 is structured and arranged, for example, either remotely from or within the welding apparatus 500, and is operable to supply a laser beam to the laser-beam transmitting fiber-optics bundle 580. In embodiments, any type of laser beam that is transmittable through fiber optics and can deliver the required amount of welding power output (e.g., 3-15 kW) for welding the different parts together may be utilized (e.g., 1.06 or 1.00 micro wavelength laser).

Additionally, a laser beam focusing lens 570 (e.g., a plano-convex lens), a collimating lens 572, and a laser beam deflecting mirror 575 are arranged in the focusing head transfer tube 560, which are operable to receive the laser from the laser-beam transmitting fiber-optics bundle 580 and to adjustable focus and output a laser beam 510 suitable for laser beam welding. As shown in FIG. 7A, with this exemplary embodiment, the laser beam deflecting mirror 575 is planar. The laser beam focusing head 505 additionally includes a removable protective lens 715 in the laser beam aperture, with a lens protective gas-knife 720 arranged on an exterior of the removable protective lens 715. As shown in FIG. 7A, the lens protective gas-knife 720 utilizes compressed gas (e.g., $P_1 > 1$ atmosphere) from a compressed gas inlet 725, as would be understood by the ordinarily-skilled artisan in LBW. The laser-focusing head 505 is operable to emit a laser beam 510 having an adjustable focal point. With an exemplary and non-limiting embodiment, the laser beam deflecting mirror 575 together with the lenses are structured and arranged to produce a laser beam having a relatively long depth of field with a relatively long focal length (e.g., approximately 1.5 meters (or 40 inches)). As should be understood, the laser beam focusing head 505 (together with the other elements of the welding apparatus 500) is structured and arranged to be moveable in direction 705 (i.e., along a longitudinal axis of the laser beam focusing head 505 and welding apparatus 500). It should be noted that while a plasma-suppressing nozzle may be utilized, the plasma-suppressing nozzle is not shown in FIG. 7A.

FIG. 7B schematically depicts an additional exemplary and non-limiting laser beam focusing head 505' for a welding apparatus in accordance with further aspects of the disclosure. In contrast to the exemplary embodiment of FIG. 7A, with the laser beam focusing head 505' of FIG. 7B, the planar deflecting mirror 575 is replaced with a parabolic focusing mirror 575' and the plano-convex focusing lens is removed.

While FIGS. 7A and 7B depict exemplary optical systems for laser beam directing and focusing, the inventors contemplate that any optical system (e.g., reflective and/or transmissive) that affords the delivery and focusing of the laser beam within the passages of the corrugation layer may be utilized in embodiments of the present disclosure.

Figure 8:
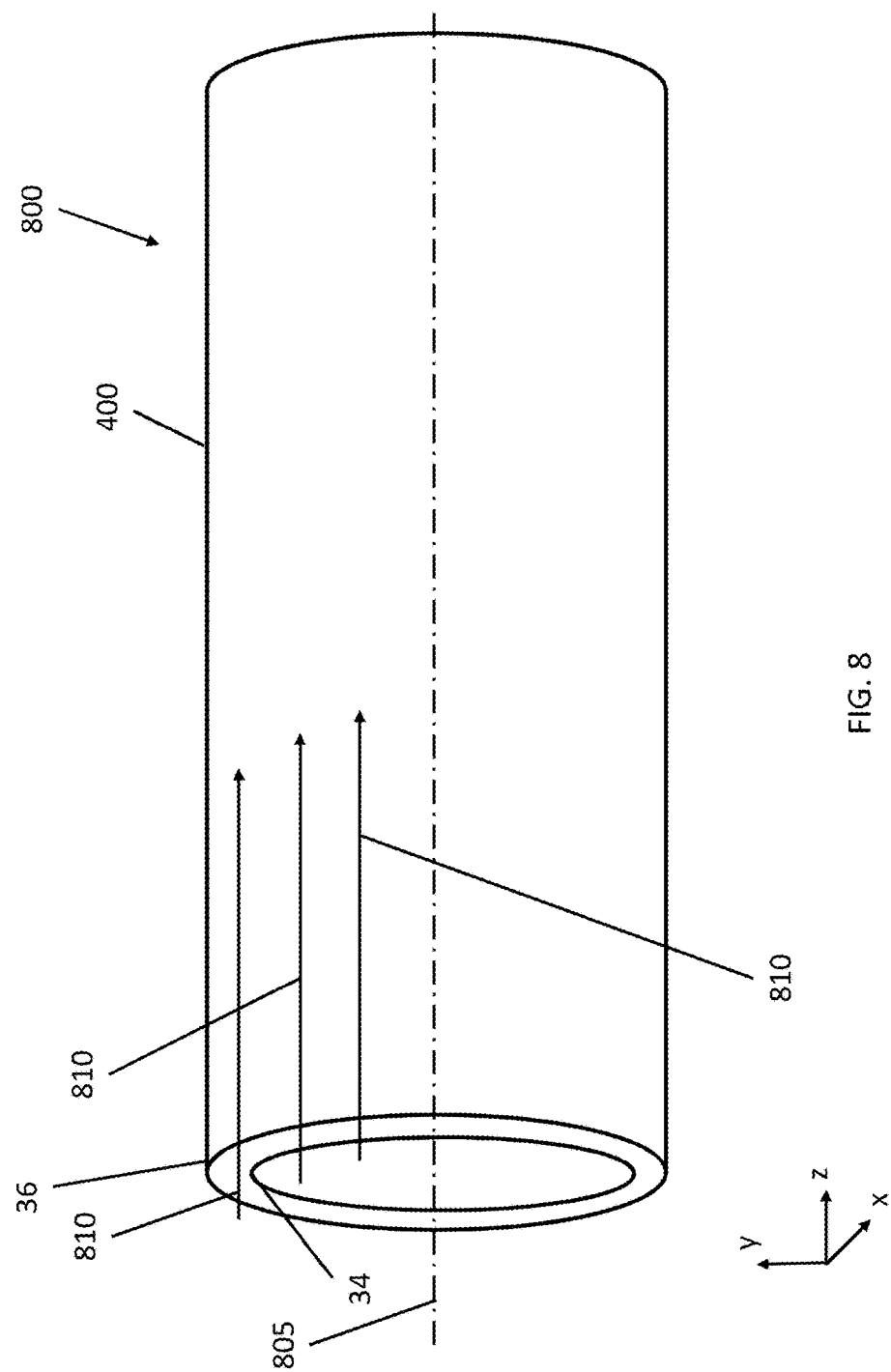
FIG. 8 shows aspects of an exemplary and non-limiting welding method in accordance with aspects of the disclosure.

FIG. 8 shows aspects of an exemplary and non-limiting welding method 800 in accordance with aspects of the disclosure. With this exemplary method, a plurality of welding apparatuses (not shown) are arranged in respective passages (not shown) formed between the corrugated layer (not shown) and the inner wall 34 and the outer wall 36 of a composite transportation tube structure 400. With this exemplary method, the direction of movement 810 of the respective welding apparatuses (or, in embodiments, a single welding apparatus) along the passages is aligned with the longitudinal axis 805 of the tube structure 400. In other words, with this exemplary configuration, the corrugated layer (not shown) is arranged such that the respective formed passages are aligned with (e.g., approximately parallel with) the longitudinal axis 805 of the tube structure 400.

Figure 9A:
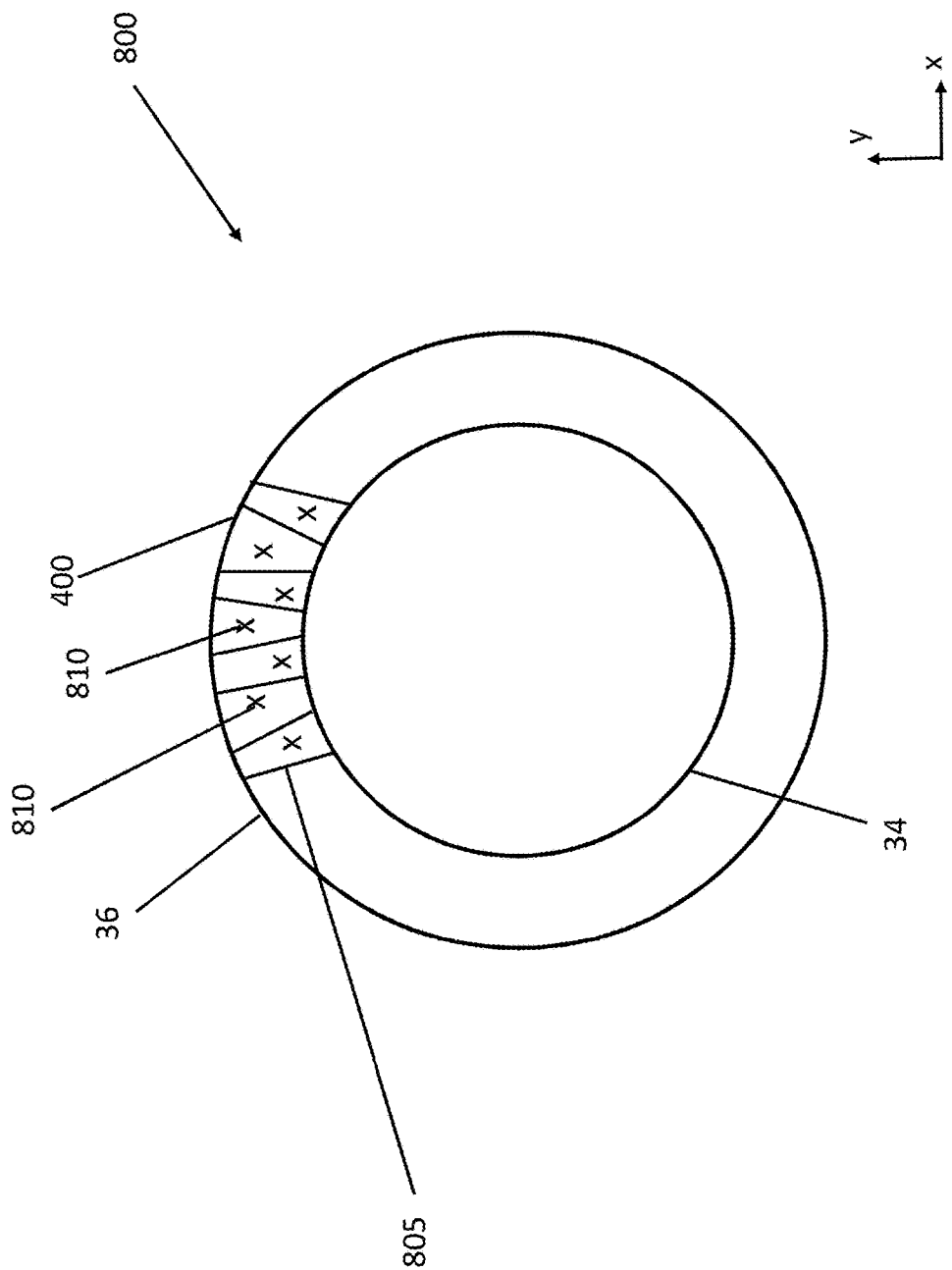
FIGS. 9A and 9B show aspects of exemplary and non-limiting welding methods in accordance with aspects of the disclosure.
Figure 9B:
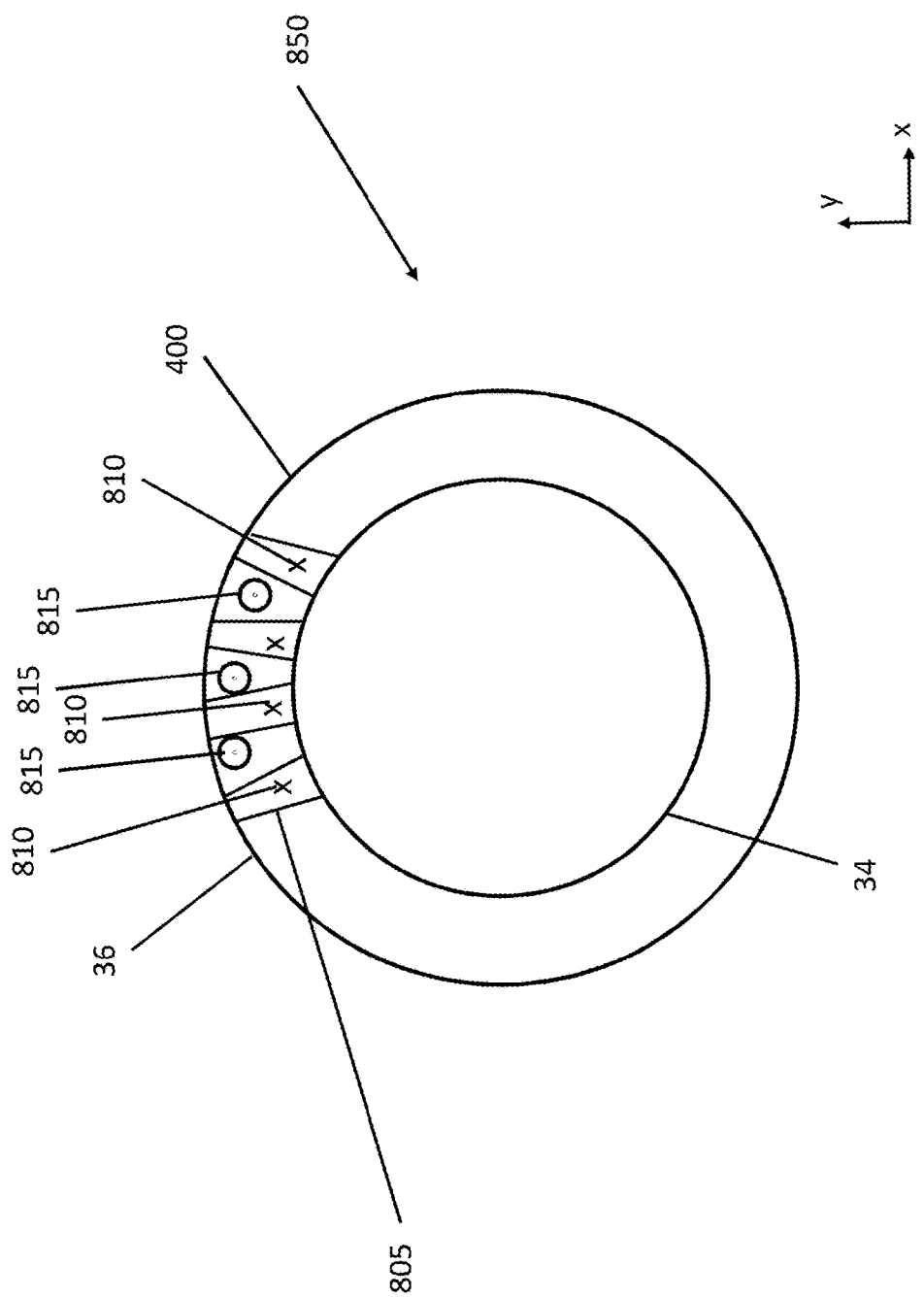

FIGS. 9A and 9B show aspects of exemplary and non-limiting welding methods in accordance with aspects of the disclosure. FIG. 9A shows an alternative view of the exemplary and non-limiting welding method 800 of FIG. 8 in accordance with aspects of the disclosure. With this exemplary method, a plurality of welding apparatuses (not shown) are arranged in respective passages formed between the corrugated layer 805 and the inner wall 34 and the outer wall 36 of a composite transportation tube structure 400 (it should be understood that only some of the passages are shown and only a portion of the corrugated layer 805 is shown for clarity). With this exemplary method, the direction of movement 810 of the respective welding apparatuses (or, in embodiments, a single welding apparatus) is along the passages (e.g., along the z-axis, into the page as shown in FIG. 9A) aligned with the longitudinal axis of the tube structure 400. In other words, with this exemplary configuration, the corrugated layer 805 is arranged such that the respective formed passages are aligned with (e.g., approximately parallel with) the longitudinal axis of the tube structure 400, and all of the welding apparatuses enter the passages from the same end.

In contrast to the exemplary method of FIG. 9A, the exemplary welding method 850 of FIG. 9B utilizes two opposite directions of movement 810, 815, wherein respective welding apparatuses traverse (e.g., simultaneously) alternating passages (formed between the corrugated layer 805 and the inner wall 34 and the outer wall 36) in opposite directions (i.e., from opposite ends of the composite tube structure 400).

Figure 10:
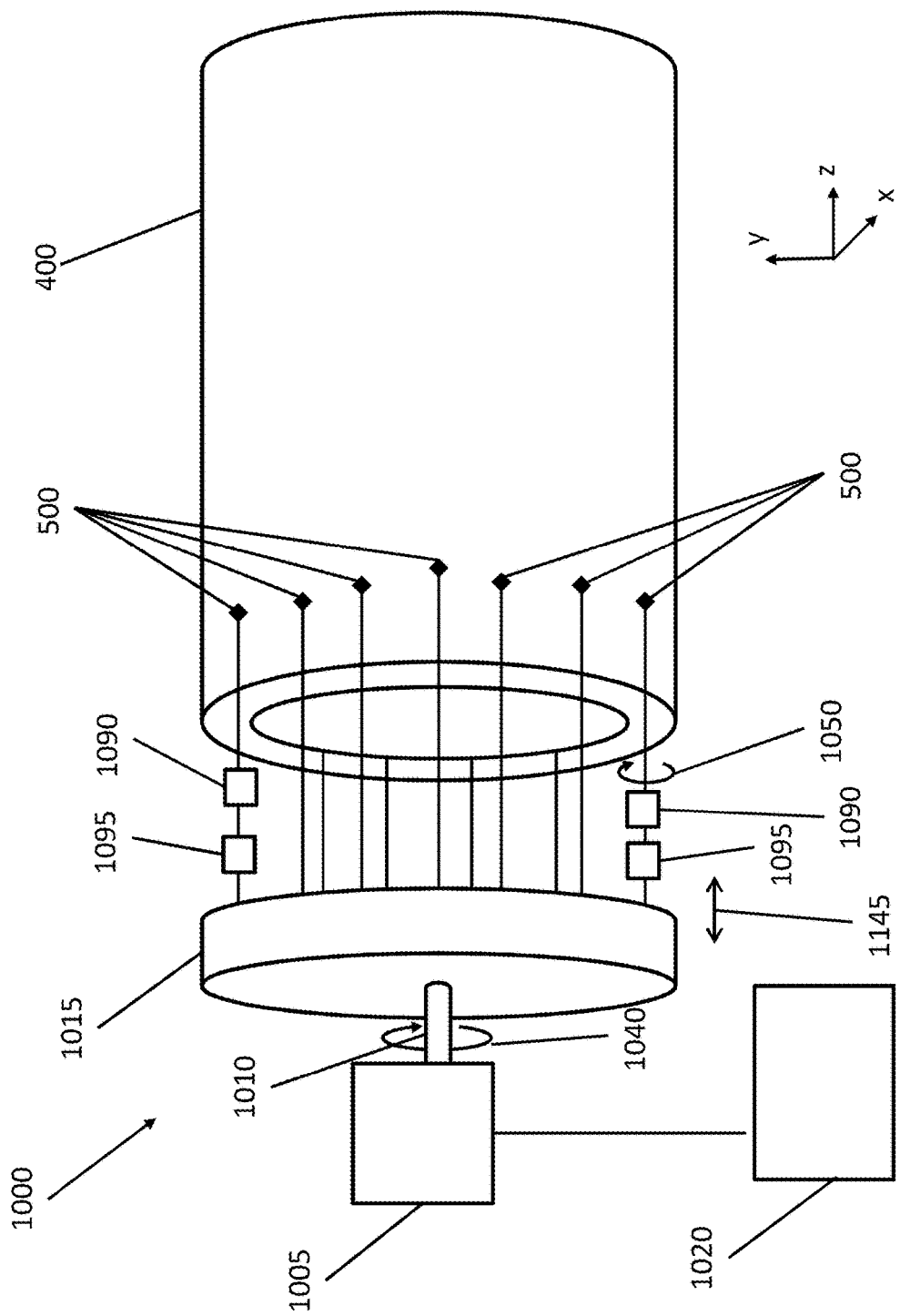
FIG. 10 shows aspects of an exemplary and non-limiting welding apparatus in accordance with aspects of the disclosure.

FIG. 10 shows aspects of an exemplary and non-limiting welding machine 1000 in accordance with aspects of the disclosure. As shown in FIG. 10, the welding machine 1000 is arranged for providing a plurality of welds to a composite tube structure 400. The welding machine 1000 includes a plurality of welding apparatuses 500 arranged on respective extensible shafts. While not depicted for all of the shafts, each shaft may include an axial mover 1095 structured and arranged to move a respective welding apparatus 500 in an axial direction 1145, and a rotator 1090 structured and arranged to rotate a respective welding apparatus 500 in direction 1050 about the axial direction. In accordance with aspects of the disclosure, the respective welding apparatuses 500 may be rotatable (e.g., by 180°) so as to re-orient each respective welding apparatus for an oppositely oriented (e.g., adjacent) passage. In further embodiments, instead of (or in addition to) being mounted to an extensible shaft, the welding apparatus 500 may be tethered to a base 1015 and configured for individually controllable self-propelled movement through the passages.

As shown in FIG. 10, the plurality of welding apparatuses 500 are mounted to a rotatable base 1015 having a shaft 1010 connected to a base support 1005. The base support 1005 is operable to rotate the base 1015 in direction 1040 to align the welding apparatuses with respective passages in the composite tube structure 400, and to align the welding apparatuses with subsequently welded respective passages in the composite tube structure 400. The base support 1005 may also include a laser generator, which may be connected to each of the welding apparatuses 500 via fiber optic cable. The welding machine 1000 also includes a controller 1020 (e.g., one or more specifically configured processors) operable to control the different movements and welding operations of the welding machine 1000.

While the exemplary embodiment of FIG. 10 depicts a welding machine for forming welds within a tubular structure, it should be understood that the invention contemplates forming welds within a substantially planar structure, which then may be subsequently formed into a tubular structure. As such, the disclosure contemplates a welding machine having a linear array of welding apparatuses 500 (instead of the circular array of welding machine 1000). Additionally, while the depicted embodiment utilizes extensible shafts, the disclosure contemplates that the respective welding apparatuses may include on-board motive sources (e.g., motorized rollers) and may utilize tethers (e.g., flexible tethers) to communicate and control the respective welding apparatuses, as well as transmit a laser beam via fiber optic cable.

Figure 11:
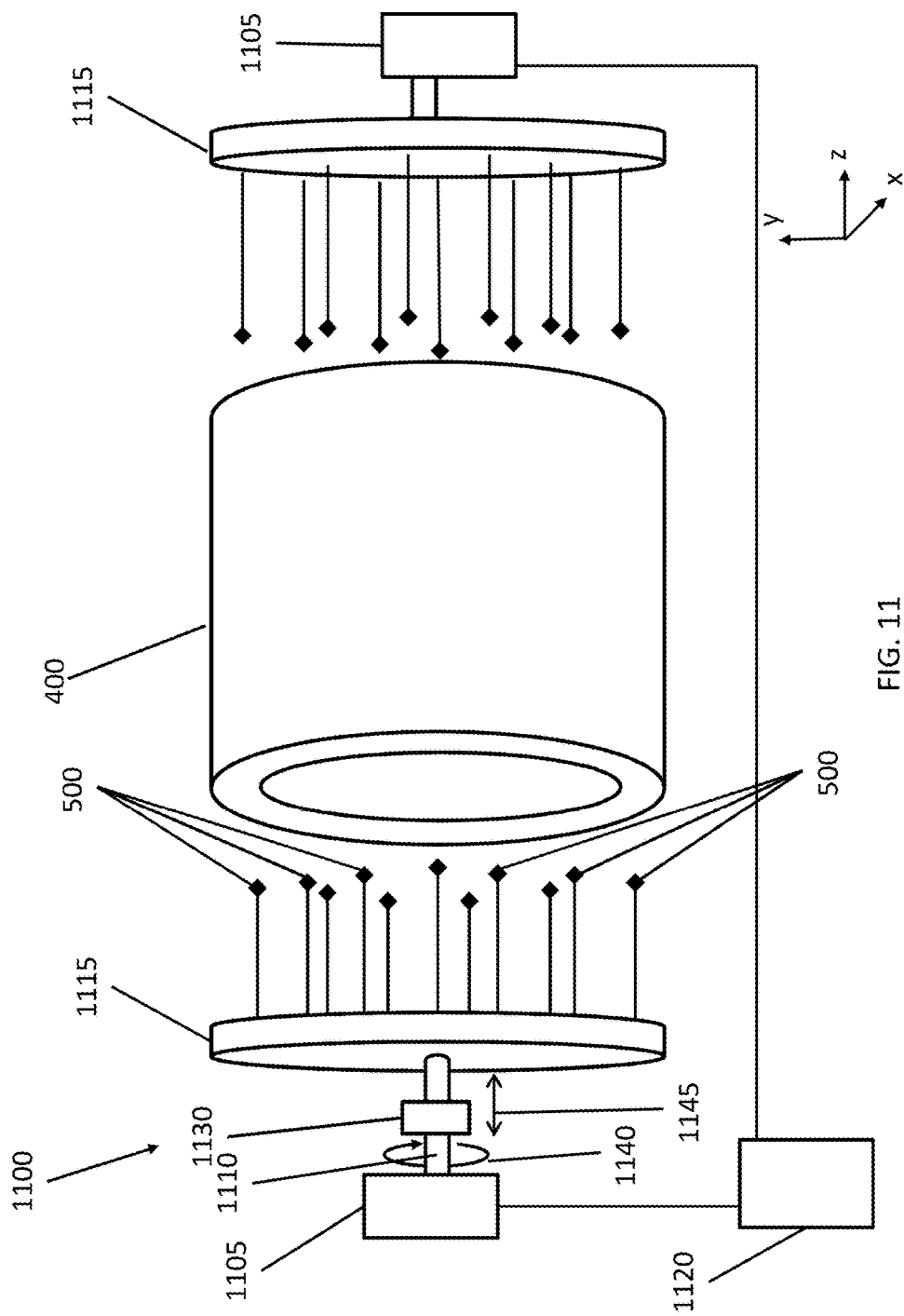
FIG. 11 shows aspects of an exemplary and non-limiting welding apparatus in accordance with aspects of the disclosure.

FIG. 11 shows aspects of an exemplary and non-limiting welding apparatus 1100 in accordance with further aspects of the disclosure. The embodiment of FIG. 11 is similar to the embodiment of FIG. 10, however, with the welding apparatus 1100, welding apparatuses 500 are arranged on both ends of the tubular structure 400 so as to form welds from opposite ends of the tubular structure. In embodiments, the oppositely arranged respective welding apparatuses may be configured to form welds in the same passages (e.g., each forming a portion of the weld for a given passage). In other embodiments, the oppositely arranged respective welding apparatuses may be configured to form welds in adjacent passages (e.g., each forming the entire weld for a given passage). That is, for example, while one welding apparatus forms a weld between the upper surface of the corrugated layer and the outer plate, the oppositely arranged welding apparatus forms a weld (e.g., substantially simultaneously) between the adjacent lower surface of the corrugated layer and the inner plate.

As additionally schematically depicted in FIG. 11, with this exemplary embodiment, the shaft 1110 includes an linear actuator 1130 (e.g., a hydraulic shaft) operable to move the entire base 1115 so that the respective welding apparatuses 500 are moved through the passages. That is, instead of each welding apparatus 500 being individually moveable longitudinally (e.g., via respective linear actuators as is the case with the exemplary embodiment of FIG. 10), with the embodiment of FIG. 11, the entire base 1115 is moveable in a direction along the longitudinal axis of the tube 400 to simultaneously move the welding apparatuses 500. The base rotator 1105 is operable to rotate the base 1115 in direction 1140 to align the welding apparatuses with respective passages in the composite tube structure 400, and to align the welding apparatuses with subsequently welded respective passages in the composite tube structure 400. The base support 1105 may also include a laser generator, which may be connected to each of the welding apparatuses 500 via fiber optic cable. The welding machine 1100 also includes a controller 1120 (e.g., one or more specifically configured processors) operable to control the different movements and welding operations of the welding machine 1100.

Figure 12:
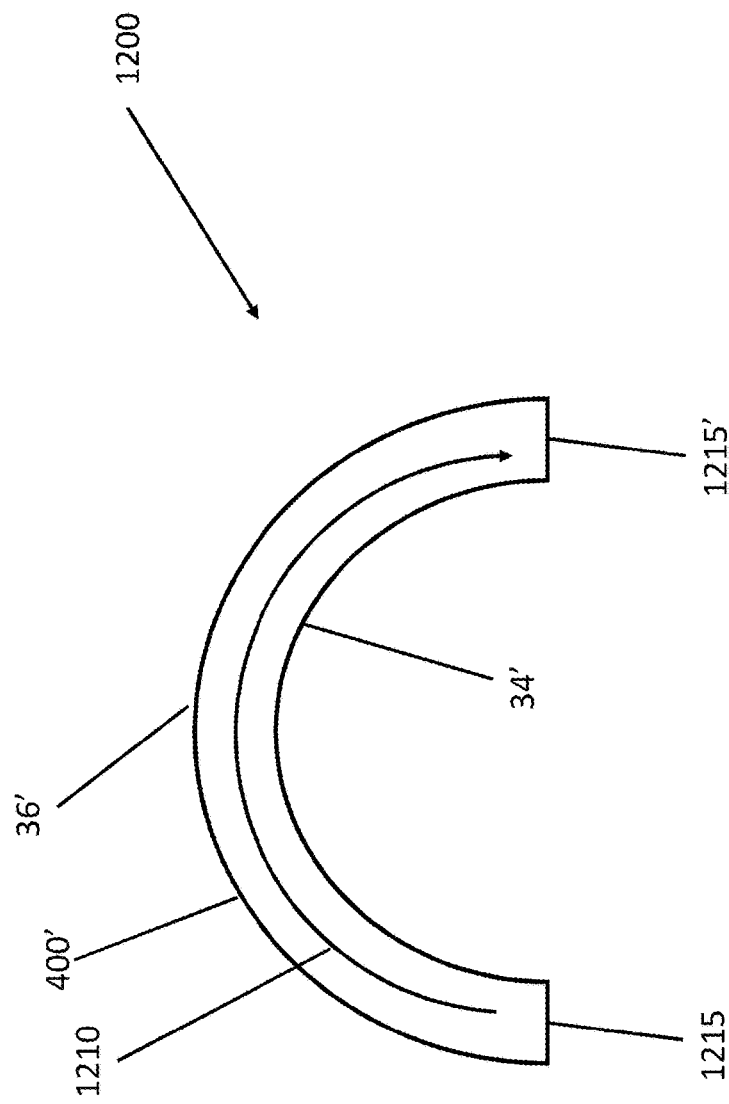
FIG. 12 shows aspects of an exemplary and non-limiting welding method in accordance with aspects of the disclosure.

FIG. 12 shows aspects of an exemplary and non-limiting welding method 1200 in accordance with aspects of the disclosure. As shown in FIG. 12, aspects of the disclosure are directed to a half tube composite structure 400' comprising an inner wall 34', and outer wall 36', and a corrugated layer (not shown) formed between the inner wall 34' and outer wall 36'. With this exemplary and non-limiting welding method 1200, the welds may be formed in a circumferential direction of welding 1210. In other words, with this exemplary configuration, the corrugated layer (not shown) is arranged such that the respective formed passages are aligned with (e.g., approximately parallel with) the circumferential direction of the tube structure 400', and all of the welding apparatuses enter the passages from the same first end 1215 and form the welds (not shown) from the first end 1215 to the second end 1215'. In embodiments, after forming the internal welds, the first end 1215 and/or the second end 1215' may be sealed with a planar layer (not shown).

Figure 13:
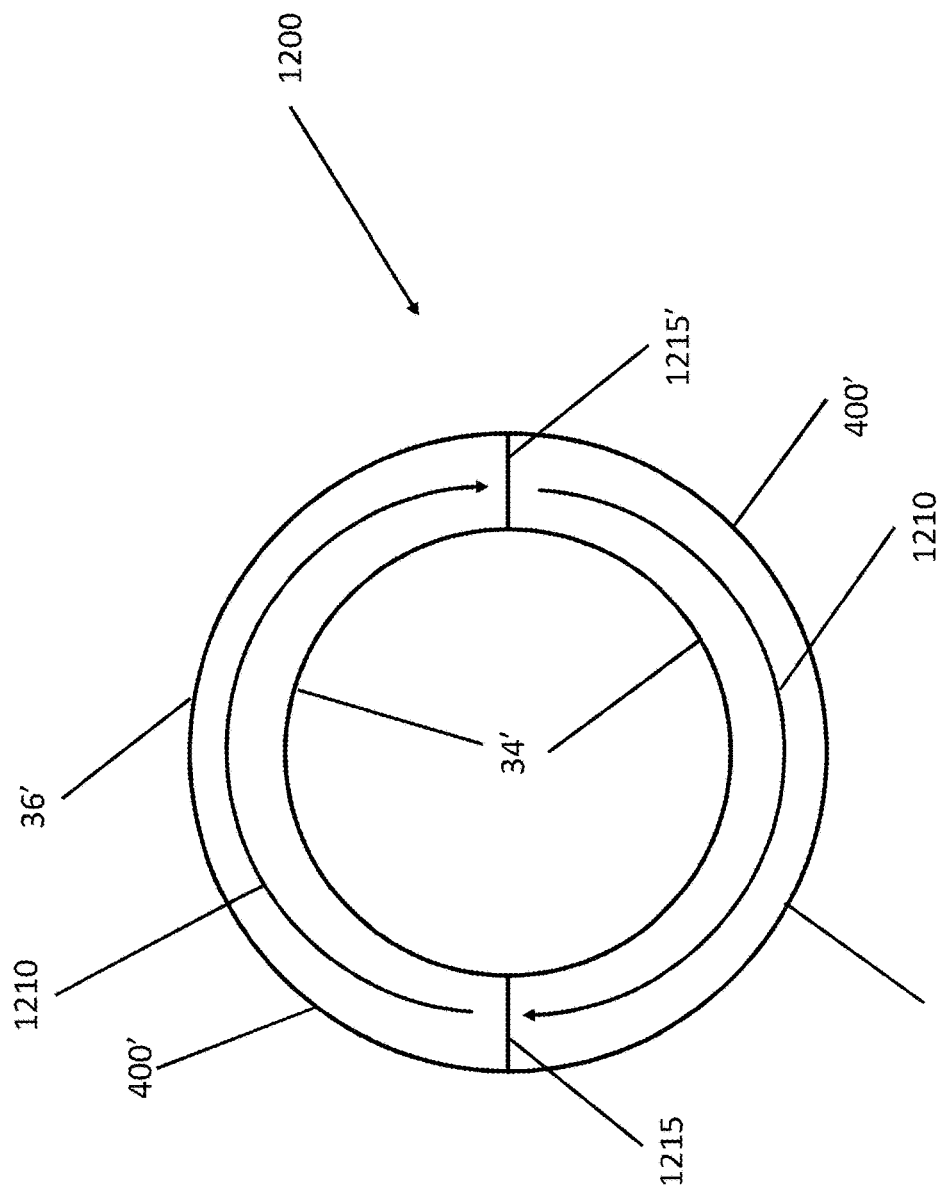
FIG. 13 shows aspects of an exemplary and non-limiting welding method in accordance with aspects of the disclosure.

FIG. 13 shows a completed tube structure formed from two half tube composite structures 400' formed using the exemplary and non-limiting welding method 1200 in accordance with aspects of the disclosure. In embodiments, the two half tube composite structures 400' may be joined to one another using the planar layers (not shown) formed on the respective first ends 1215 and/or the respective second ends 1215'.

Figure 14:
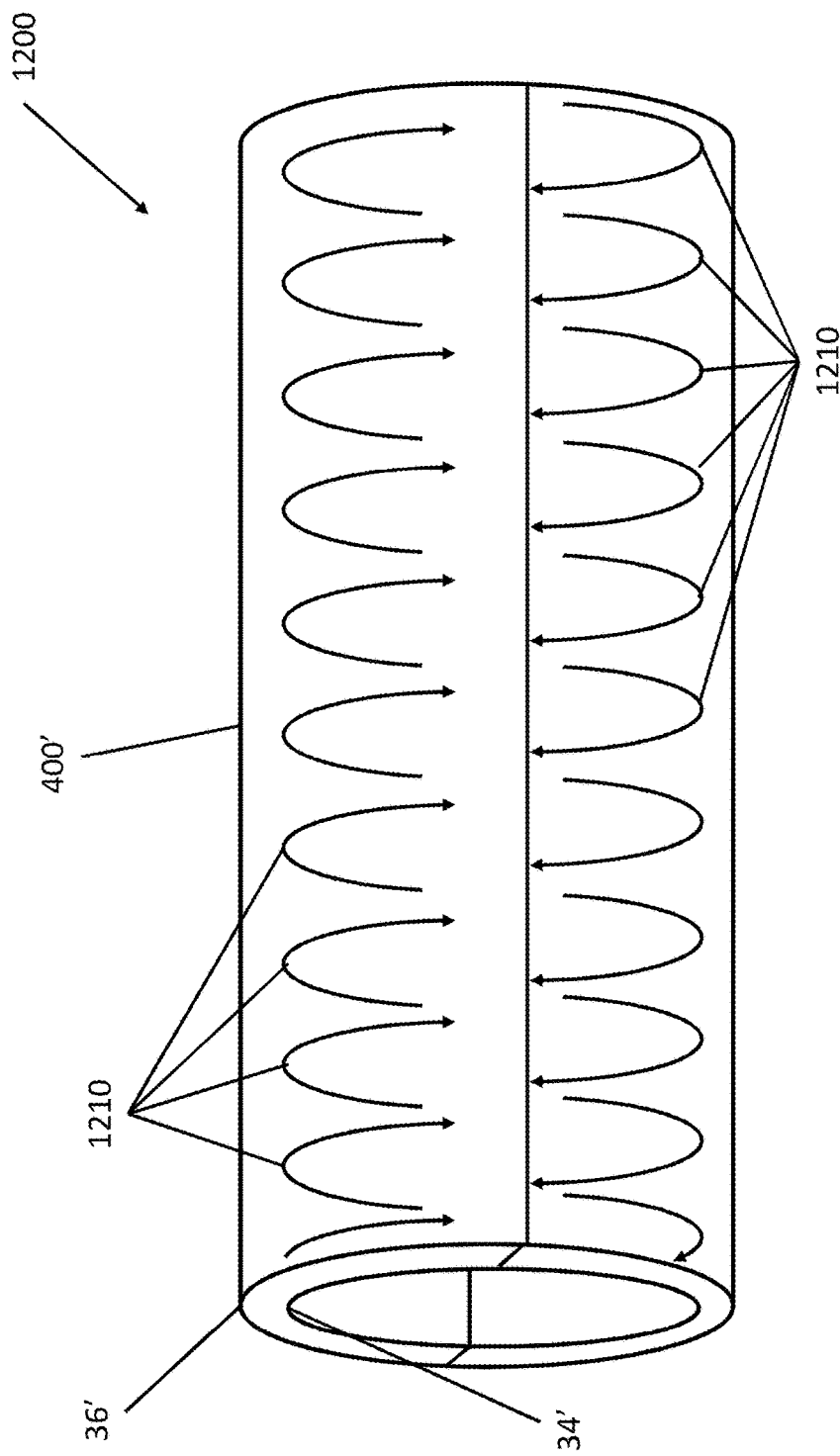
FIG. 14 shows aspects of an exemplary and non-limiting welding method in accordance with aspects of the disclosure.

FIG. 14 shows a schematic perspective view of the exemplary and non-limiting welding method 1200 in accordance with aspects of the disclosure. As schematically depicted in FIG. 14, the welds may be formed in a circumferential direction of welding 1210. In other words, with this exemplary configuration, the corrugated layer (not shown) is arranged such that the respective formed passages are aligned with (e.g., approximately parallel with) the circumferential direction of the half tube composite structure 400'

Figure 15A:
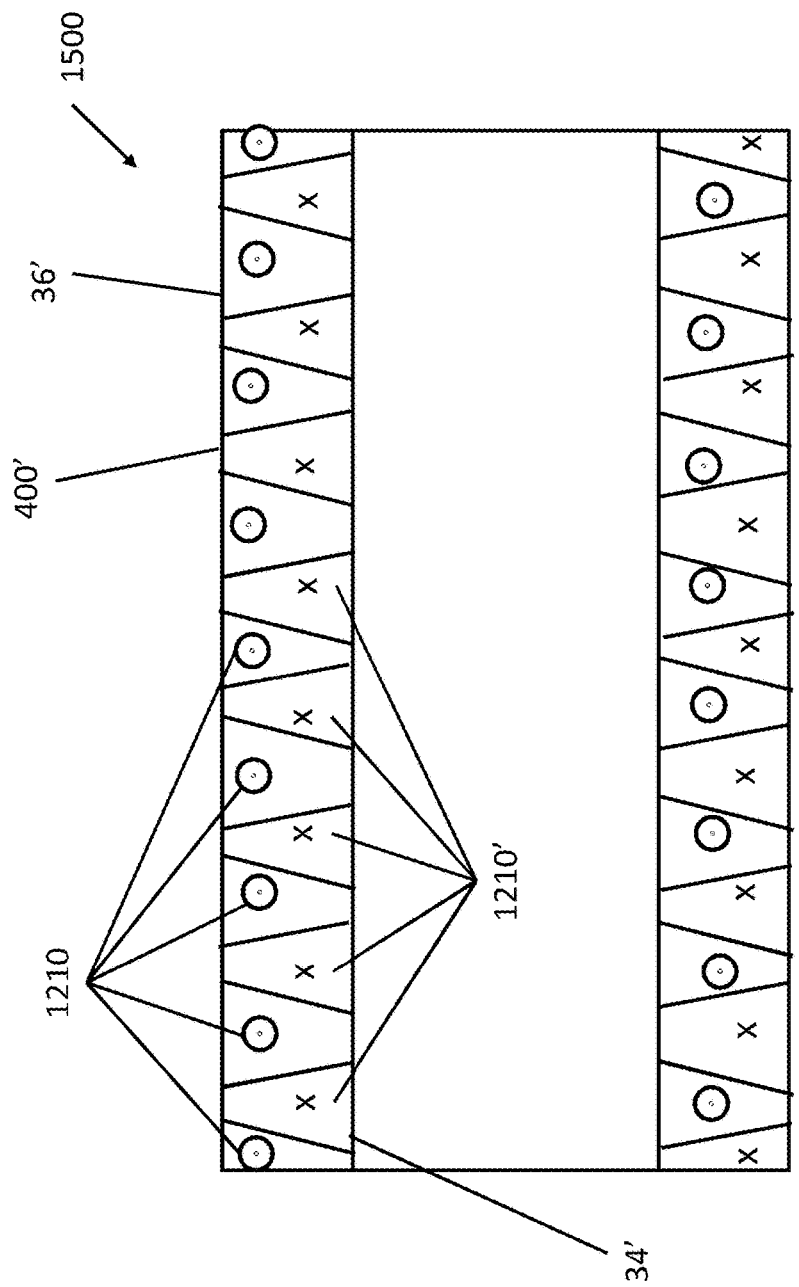
FIGS. 15A and 15B show aspects of exemplary and non-limiting welding methods in accordance with aspects of the disclosure.
Figure 15B:
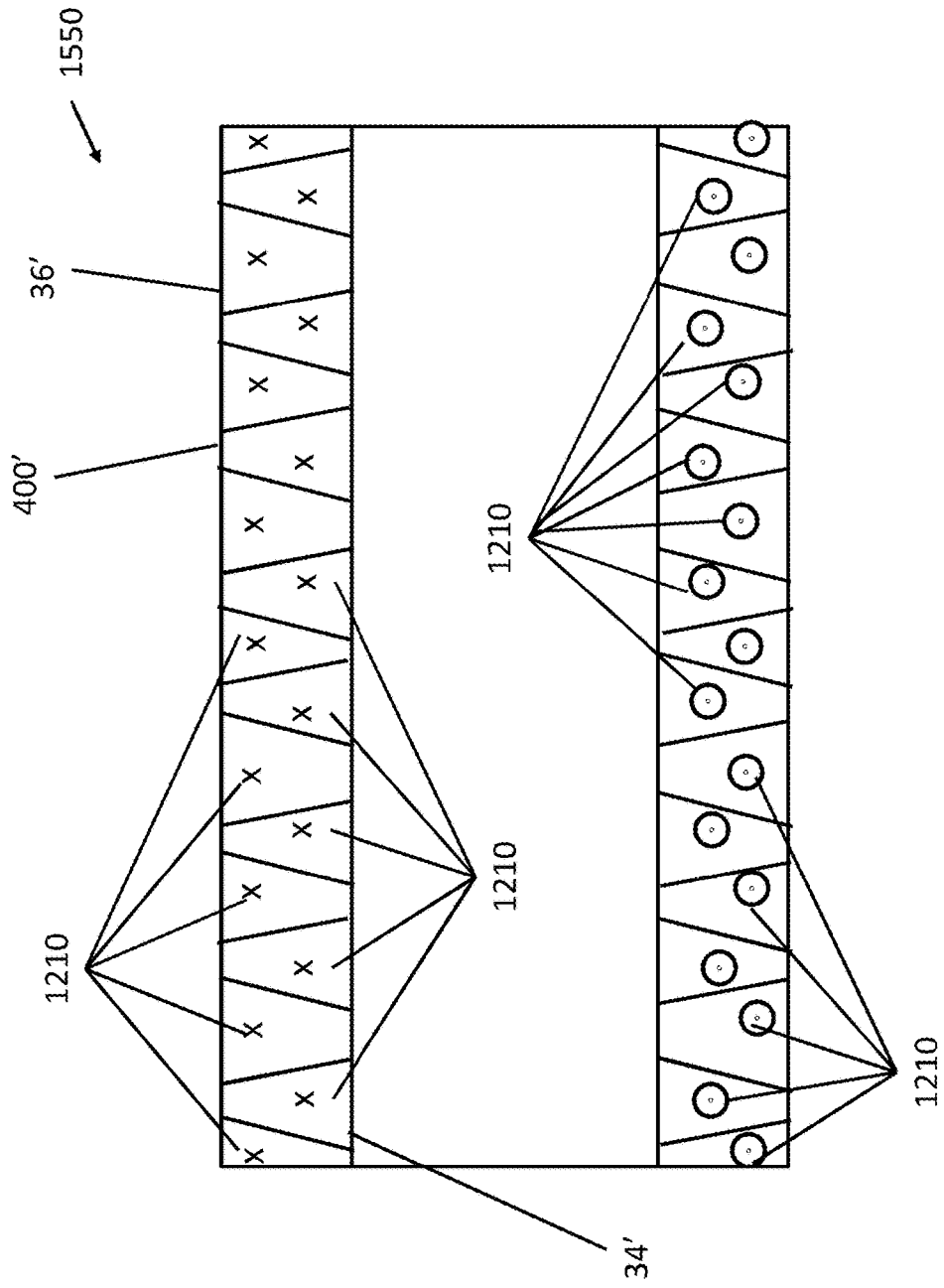

FIGS. 15A and 15B show aspects of exemplary and non-limiting welding methods in accordance with aspects of the disclosure. As shown in FIG. 15A, welding method 1500 utilizes two opposite directions of movement 1210, 1210', wherein respective welding apparatuses traverse alternating passages (formed between the corrugated layer and the inner wall 34' and the outer wall 36') in opposite directions (i.e., from different ends of the half tube composite structure 400'). In contrast, as shown in FIG. 15B, welding method 1550 utilizes one direction of movement 1210, wherein respective welding apparatuses traverse alternating passages (formed between the corrugated layer and the inner wall 34' and the outer wall 36') in the same direction (i.e., from the same ends of the half tube composite structure 400').

Figure 16:
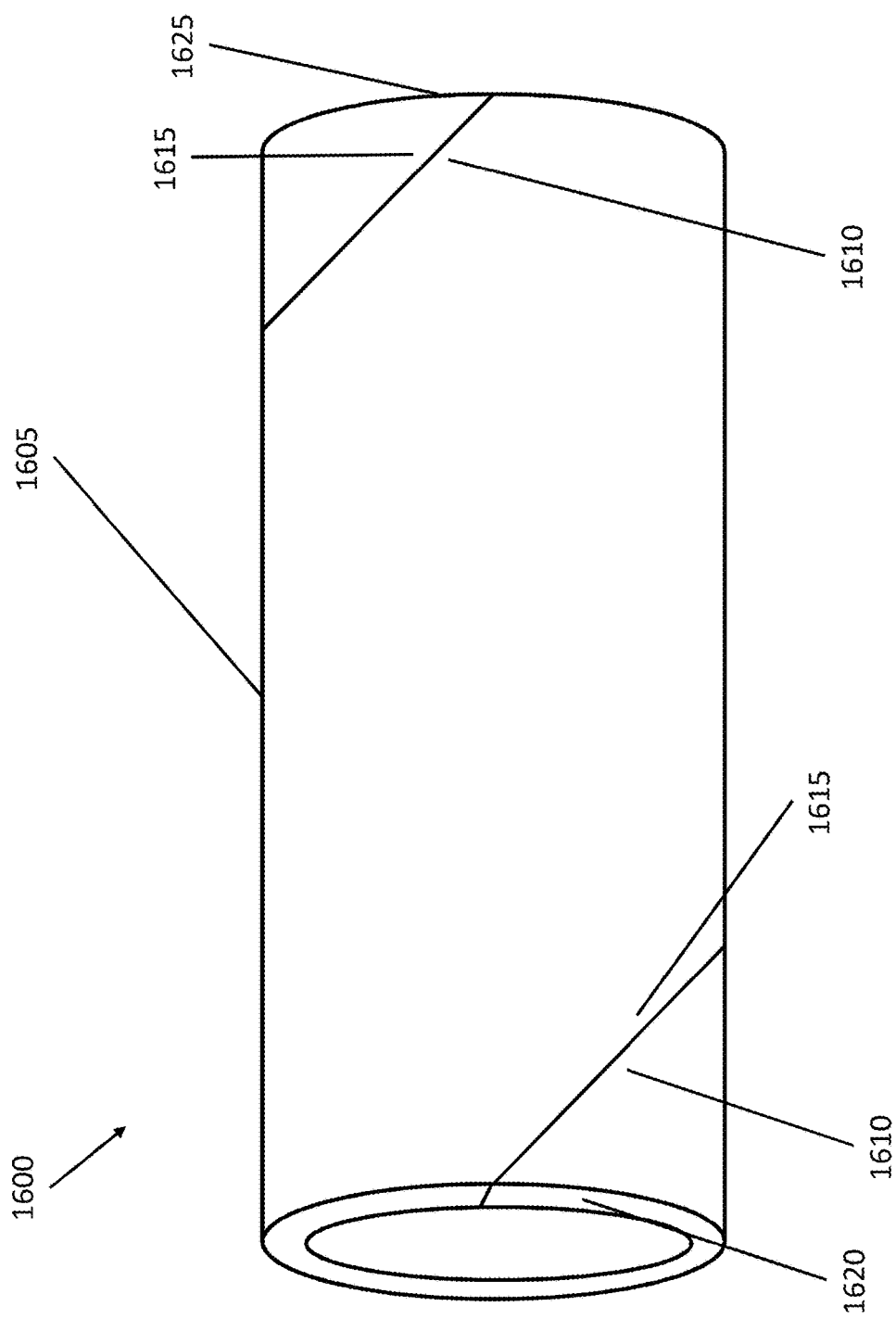
FIG. 16 shows an exemplary and non-limiting composite structure in accordance with aspects of the disclosure.

FIG. 16 shows an exemplary and non-limiting composite structure 1600 in accordance with aspects of the disclosure. As shown in FIG. 16, in embodiments the composite structure 1600 may be formed, e.g., using one or more pipe mills, to have a similar structure as that of a toilet paper roll core. As shown in FIG. 16, the composite structure 1600 is formed from a composite material 1605 having a first end edge 1620, a second end edge 1625, a first seam edge 1610 and a second seam edge 1615.

In accordance with aspects of the disclosure, in embodiments, the tubular composite structure 1600 may be formed as a tubular structure and subsequently the internal corrugated layer (not shown) may be welded to the inner and outer walls. In other contemplated embodiments, the tubular composite structure 1600 may be formed initially as a planar structure, the internal corrugated layer (not shown) may be welded to the inner and outer walls, and the planar structure may subsequently be formed into a tubular structure (e.g., using one or more pipe mills). With other contemplated embodiments, the inner wall may be formed into a tubular structure (e.g., using a pipe mill), after which the corrugated layer is formed around the inner wall tubular structure. As the outer tubular structure is not yet arranged on the corrugated layer, there may be less restriction on access to the corrugated layer for forming welds to the inner wall. Subsequently, (and whether or not welds have been formed between the corrugated layer and the inner tube), the outer tube may be formed around the combined inner tube and corrugated layer (e.g., using a pipe mill), after which the internal welds between the outer tube and the corrugated layer (and if not yet performed, the internal welds between the corrugated layer and the inner tube may be formed).

Figure 17:
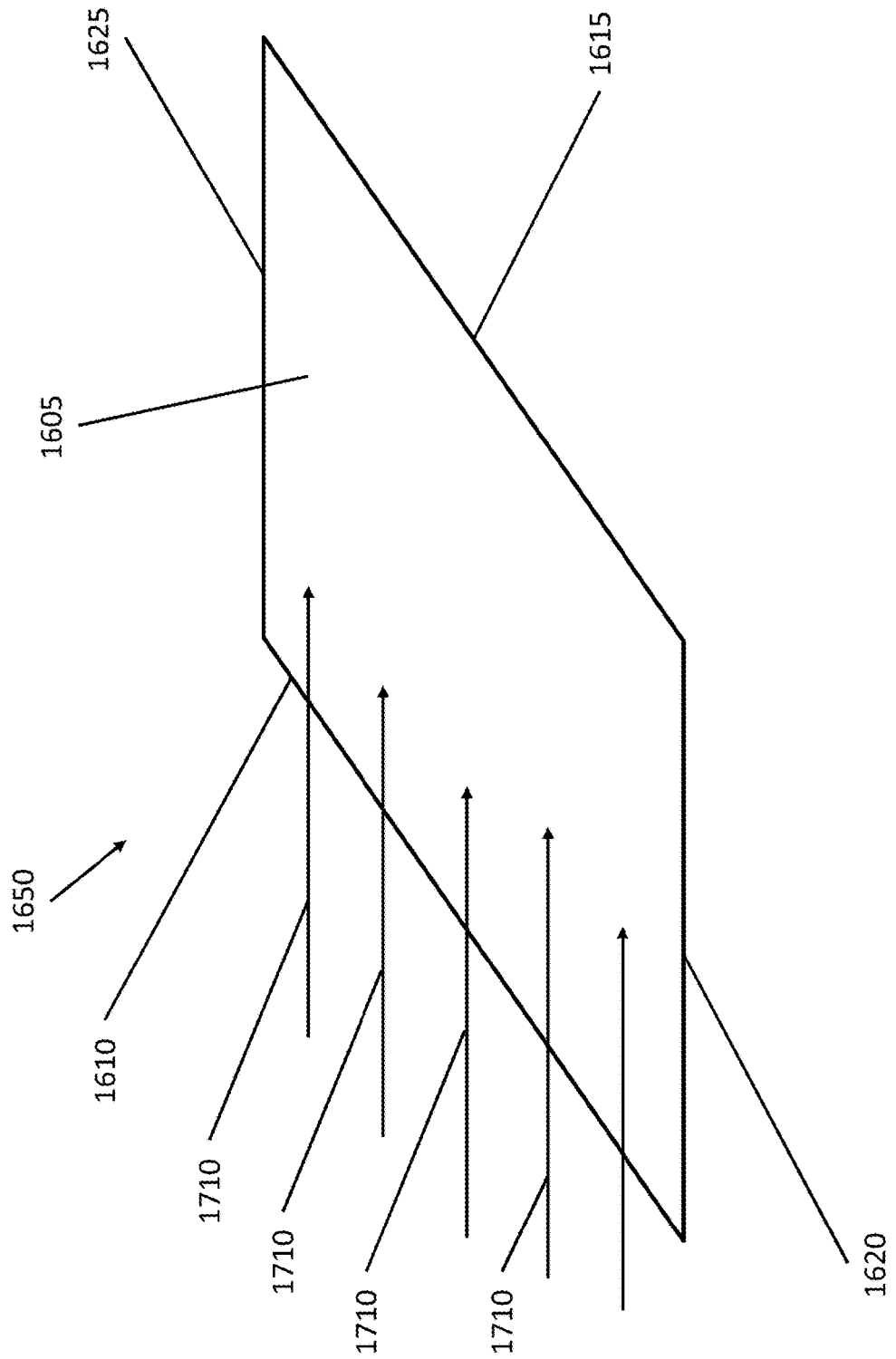
FIG. 17 shows aspects of an exemplary and non-limiting welding method in accordance with aspects of the disclosure.

FIG. 17 schematically depicts aspects of an exemplary and non-limiting welding method 1650 in accordance with aspects of the disclosure. As should be understood, FIG. 17 depicts the composite material 1605 of FIG. 16 in an "un-rolled" orientation. As shown in FIG. 17, the composite material 1605 includes a first end edge 1620, a second end edge 1625, a first seam edge 1610 and a second seam edge 1615. With the exemplary and non-limiting welding method 1650, a plurality of welding apparatuses (not shown) form welds along a welding direction 1710. With this exemplary method, the direction of movement 1710 of the respective welding apparatuses (or, in embodiments, a single welding apparatus) along the passages is aligned with the first end edge 1620 and a second end edge 1625 of the composite material 1605. In other words, with this exemplary configuration, the corrugated layer (not shown) is arranged such that the respective formed passages are aligned with (e.g., approximately parallel with) the first end edge 1620 and a second end edge 1625 of the composite material 1605. In accordance with aspects of the disclosure, when the composite material 1605 is subsequently formed into a tube structure (e.g. as depicted in FIG. 16), the passages (and thus, the welds formed therein) are arranged in a circumferential manner about the tube structure (e.g., similar to as depicted in FIG. 14).

Figure 18:
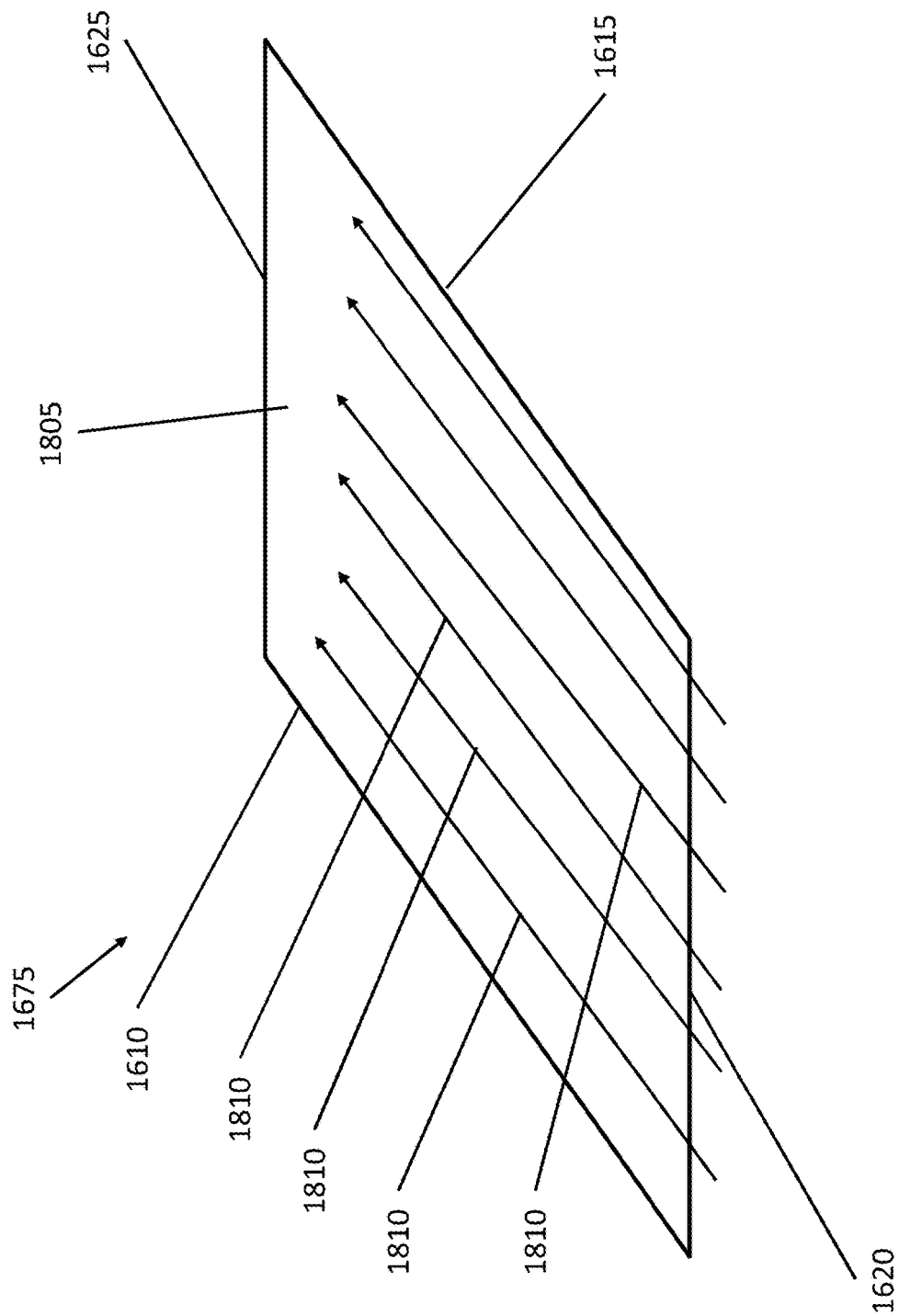
FIG. 18 shows aspects of an exemplary and non-limiting welding method in accordance with aspects of the disclosure.

FIG. 18 shows aspects of an exemplary and non-limiting welding method 1675 in accordance with aspects of the disclosure. As should be understood, FIG. 18 depicts the composite material 1805 (similar to composite material 1605 of FIG. 16) in an "un-rolled" orientation. As shown in FIG. 18, the composite material 1805 includes a first end edge 1620, a second end edge 1625, a first seam edge 1610 and a second seam edge 1615. With the exemplary and non-limiting welding method 1675, a plurality of welding apparatuses (not shown) form welds along a welding direction 1810. With this exemplary method, the direction of movement 1810 of the respective welding apparatuses (or, in embodiments, a single welding apparatus) along the passages is aligned with the first seam edge 1610 and the second seam edge 1615 of the composite material 1805. In other words, with this exemplary configuration, the corrugated layer (not shown) is arranged such that the respective formed passages are aligned with (e.g., approximately parallel with) the first seam edge 1610 and the second seam edge 1615 of the composite material 1805. In accordance with aspects of the disclosure, when the composite material 1805 is subsequently formed into a tube structure (e.g. similar to as depicted in FIG. 16), the passages (and thus, the welds formed therein) are arranged in a spiraling manner about the tube structure.

Figure 19:
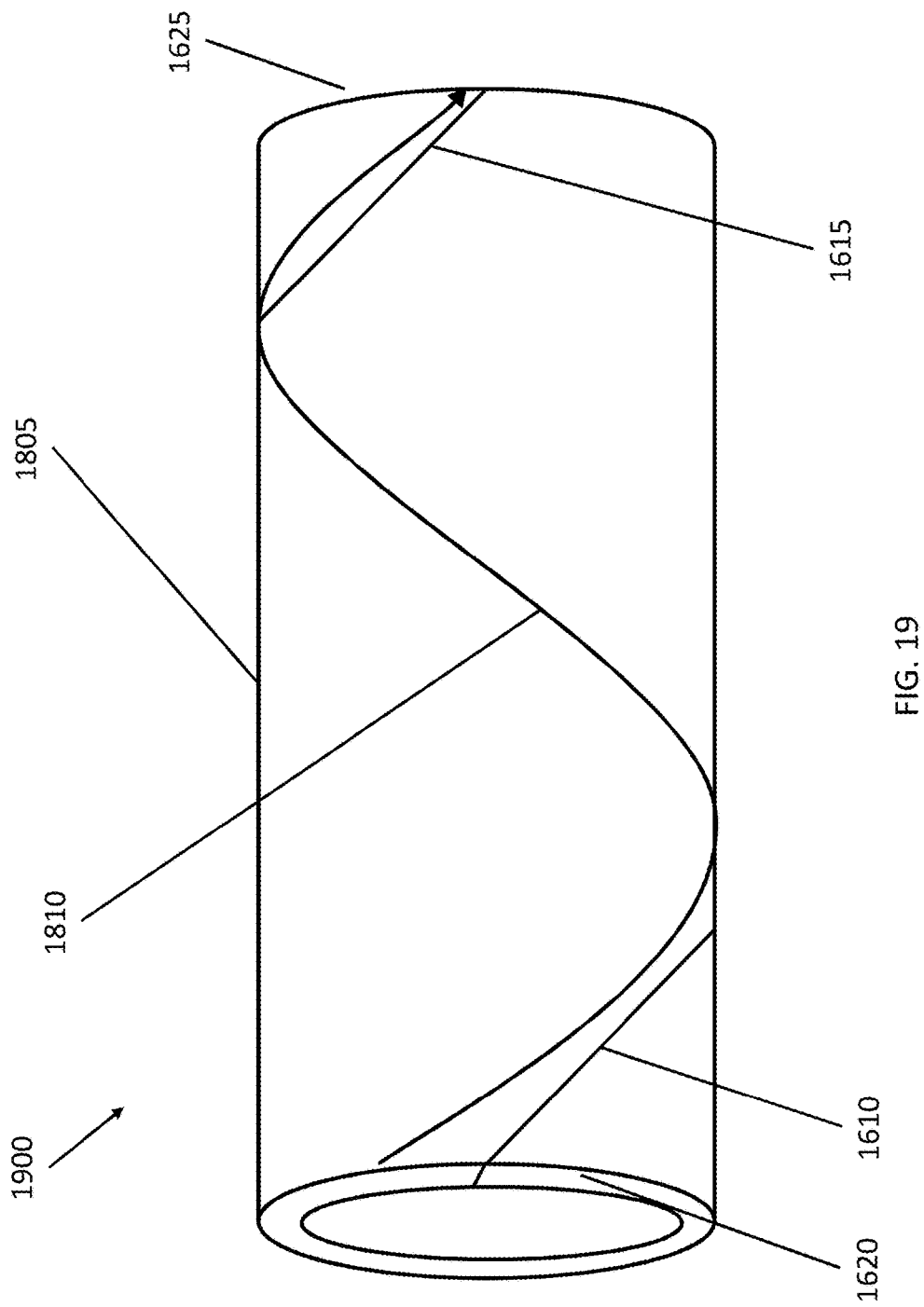
FIG. 19 shows aspects of an exemplary and non-limiting composite structure formed using a welding method in accordance with aspects of the disclosure.

FIG. 19 shows a schematically depicted exemplary and non-limiting composite structure 1900 formed using the welding method of FIG. 18 in accordance with aspects of the disclosure. As shown in FIG. 19, when the composite material 1805 is subsequently formed into a tube structure, the passages (and thus, the welds formed therein) are arranged along the direction of welding 1810 in a spiraling manner about the tube structure.

As noted above, in embodiments, tubes may be formed using one or more spiral welded pipe mills to roll the composite sheet (or strip) into tube by a certain forming angle, further weld it into steel pipe (e.g., using a submerged arc welder). Large diameter pipes can be produced with narrow steel strip. Larger diameters may require wider plates, which may render traditional pipe mills less cost-effective. Such pipe may be produced in spiral pipe mills, where the pipe diameter is no longer a function of plate width.

System Environment

Aspects of embodiments of the present disclosure (e.g., control systems for one or more welding apparatus 500 or welding machine 1000) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet,
- a magnetic storage device,
- a usb key, and/or
- a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 20:
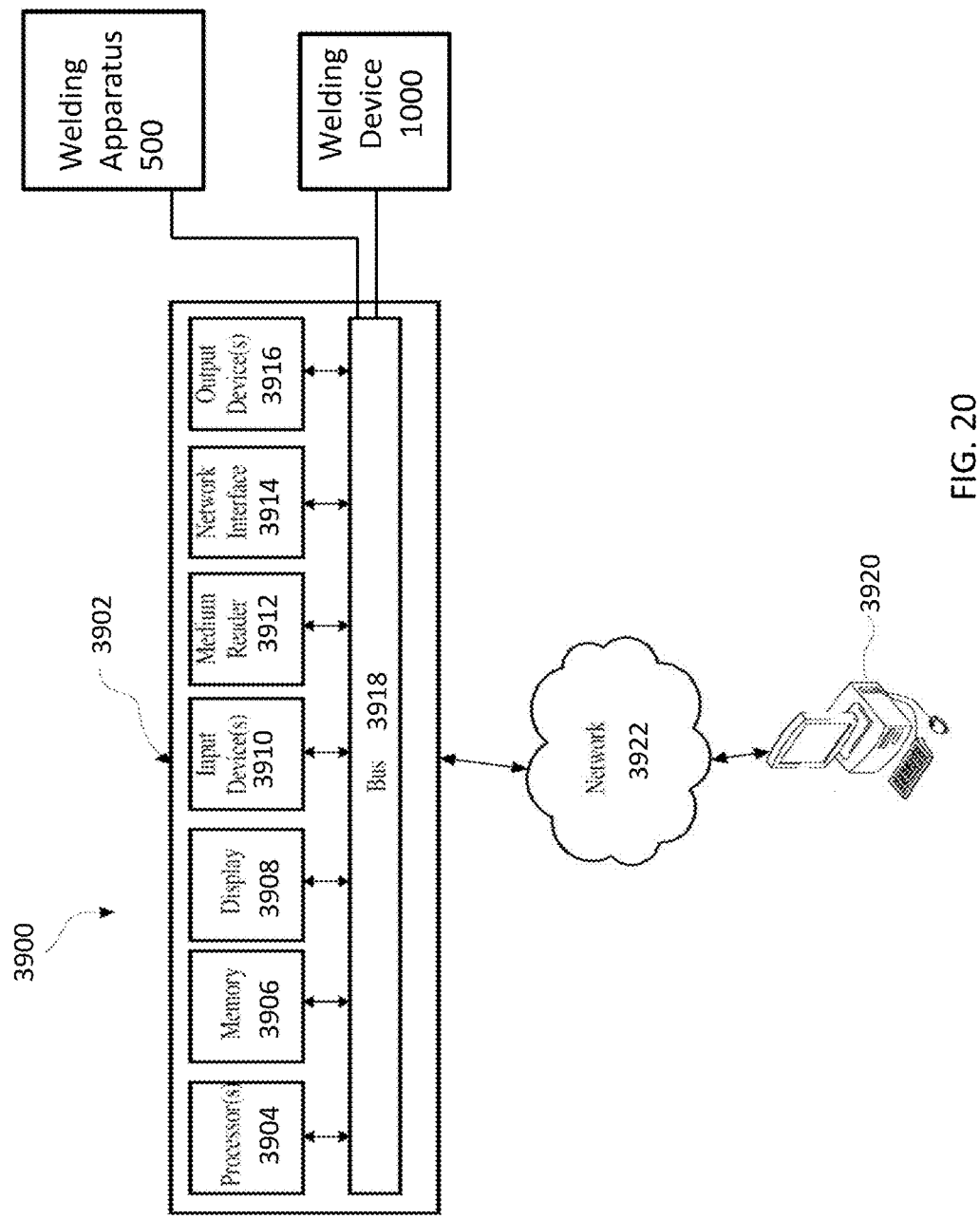
FIG. 20 shows an exemplary system environment for control for a welding apparatus in accordance with aspects of the disclosure.

FIG. 20 shows an exemplary system environment and control for a welding apparatus in accordance with the embodiments described herein in accordance with aspects of the disclosure. The system 3900 is generally shown and may include a computer system 3902, which is generally indicated. The computer system 3902 may operate as a stand-alone device or may be connected to other systems or peripheral devices. For example, the computer system 3902 may include, or be included within, any one or more computers, servers, systems, communication networks or cloud environment. As shown in FIG. 20, the system 3900 may be used to control one or more individual welding apparatus 500 and/or a welding device 1000.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 20, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 20, the computer system 3902 may include a computer display 3908, such as a liquid crystal display, an organic light emitting diode, a flat panel display, a solid state display, a cathode ray tube, a plasma display, or any other known display. The computer system 102 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 20. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A laser beam welding apparatus, comprising
a base;
a laser focusing head attached to the base and operable to emit a laser beam; and
a plurality of aligning structures attached to the base, wherein each of the plurality of aligning structures includes a leg extending from the base of the welding apparatus, and a respective roller arranged at ends of the leg, wherein the respective rollers are structured and arranged to be engagable with corners of an internal passage of a composite structure.

2. The laser beam welding apparatus of claim 1, wherein the plurality of aligning structures are arranged along a longitudinal axis of the base of the welding apparatus.

3. The laser beam welding apparatus of claim 1, wherein the laser focusing head rotatably attached to the base, such that the laser focusing head is rotatably adjustable.

4. The laser beam welding apparatus of claim 1, further comprising a laser-beam transmitting fiber-optic cable and laser beam focusing arrangement, wherein the laser-beam transmitting fiber-optic cable is operable to receive a laser beam from a laser beam generator, and transmit the laser beam to the laser beam focusing arrangement.

5. The laser beam welding apparatus of claim 4, wherein the laser beam focusing arrangement includes one or more lenses and a mirror.

6. The laser beam welding apparatus of claim 1, wherein the laser beam welding apparatus is configured as a semi-autonomous vehicle operable to traverse the passage.

7. The laser beam welding apparatus of claim 1, wherein the laser beam welding apparatus is configured to form a weld along a direction of travel of the laser beam welding apparatus as the laser beam welding apparatus traverses the internal passage of the composite structure.

8. The laser beam welding apparatus of claim 1, wherein the laser beam welding apparatus is configured to form a weld as the laser beam welding apparatus traverses the internal passage of the composite structure.

* * * * *